US008366135B2

United States Patent
Asbach et al.

(10) Patent No.: US 8,366,135 B2
(45) Date of Patent: Feb. 5, 2013

(54) CHILDREN'S RIDE-ON VEHICLES HAVING DETECTION SYSTEMS

(75) Inventors: Ronald M. Asbach, Grand Island, NY (US); Mark J. Bergum, Clarence, NY (US); William R. Howell, Arcade, NY (US); Gary G. Lenihan, East Auroa, NY (US); Scott H. McIlvain, Holland, NY (US); David G. Waples, Orchard Park, NY (US)

(73) Assignee: Mattel, Inc., El Segundo, CA (US)

( * ) Notice: Subject to any disclaimer, the term of this patent is extended or adjusted under 35 U.S.C. 154(b) by 745 days.

(21) Appl. No.: 12/547,880

(22) Filed: Aug. 26, 2009

(65) Prior Publication Data
US 2010/0059968 A1   Mar. 11, 2010

Related U.S. Application Data

(63) Continuation-in-part of application No. 11/728,049, filed on Mar. 23, 2007, now Pat. No. 7,621,552, which is a continuation of application No. 10/966,991, filed on Oct. 15, 2004, now Pat. No. 7,207,588.

(60) Provisional application No. 60/589,267, filed on Jul. 19, 2004, provisional application No. 61/115,830, filed on Nov. 18, 2008.

(51) Int. Cl.
*B60D 1/24* (2006.01)

(52) U.S. Cl. .................................................. 280/446.1

(58) Field of Classification Search ............... 280/446.1; 180/65.8
See application file for complete search history.

(56) References Cited

U.S. PATENT DOCUMENTS

| 1,358,252 | A | 11/1920 | Schneider |
| 2,201,910 | A | 5/1940 | Meienborn |
| 2,233,116 | A | 2/1941 | Voorheis |
| 2,493,874 | A | 1/1950 | Hume |
| 2,602,266 | A | 7/1952 | Preston |

(Continued)

FOREIGN PATENT DOCUMENTS

| CA | 2593792 | 1/2009 |
| CA | 2645796 | 6/2009 |

(Continued)

OTHER PUBLICATIONS

English-language abstract of European Patent No. EP 1,580,043, downloaded on or about Oct. 7, 2010 from http://v3.espacenet.com/publicationDetails/biblio?DB=EPODOC&adjacent=true&locale=en_EP&FT=D&date=20050928&CC=EP&NR=1580043A1&KC=A1.

(Continued)

*Primary Examiner* — Tony H. Winner
*Assistant Examiner* — Daniel Yeagley
(74) *Attorney, Agent, or Firm* — DASCENZO Intellectual Property Law, P.C.

(57) ABSTRACT

A children's ride-on vehicle is disclosed. In some embodiments, the vehicle may include a body having a seat assembly configured to support a child; and a drive assembly adapted to selectively drive rotation of at least one driven wheel in a plurality of drive configurations, and including a motor assembly comprising at least one electric motor, at least one user input device positioned to receive inputs from a child supported by the seat assembly and adapted to selectively actuate the motor assembly, a battery assembly adapted to selectively energize the motor assembly, and a detection system adapted to detect whether an accessory is coupled to the body. The drive assembly being adapted to restrict driving of the at least one driven wheel to less than all drive configurations of the plurality of drive configurations based on the detection system detecting whether the accessory is coupled to the body.

25 Claims, 9 Drawing Sheets

U.S. PATENT DOCUMENTS

| | | | |
|---|---|---|---|
| 3,305,246 | A | 2/1967 | Gonczy et al. |
| 3,700,059 | A | 10/1972 | Sutton |
| 3,733,090 | A | 5/1973 | Keller |
| 3,747,265 | A | 7/1973 | Gagnon |
| 3,822,501 | A | 7/1974 | Kelterstr |
| 3,947,839 | A | 3/1976 | Zigmant |
| 3,964,767 | A | 6/1976 | Williams |
| 4,025,085 | A | 5/1977 | Jacobs |
| 4,040,006 | A | 8/1977 | Kimmel |
| 4,122,390 | A | 10/1978 | Kollitz et al. |
| 4,204,700 | A | 5/1980 | Haines, Sr. |
| 4,211,428 | A | 7/1980 | Barcus |
| 4,232,910 | A | 11/1980 | Snyder |
| 4,254,998 | A | 3/1981 | Marshall et al. |
| 4,304,066 | A | 12/1981 | Brand et al. |
| 4,366,645 | A | 1/1983 | Crain et al. |
| 4,372,075 | A | 2/1983 | Harkins |
| 4,512,483 | A | 4/1985 | Crossley et al. |
| 4,513,837 | A | 4/1985 | Archer |
| 4,516,648 | A | 5/1985 | Berger et al. |
| 4,516,948 | A | 5/1985 | Obara |
| 4,522,420 | A | 6/1985 | Hannappel |
| 4,556,232 | A | 12/1985 | Sever |
| 4,558,263 | A | 12/1985 | Harris et al. |
| 4,562,893 | A | 1/1986 | Cunard |
| 4,617,001 | A | 10/1986 | Parein |
| 4,627,633 | A | 12/1986 | Gehman et al. |
| 4,638,880 | A | 1/1987 | Togashi |
| 4,700,966 | A | 10/1987 | Hawkins et al. |
| 4,708,683 | A | 11/1987 | Lehmann et al. |
| 4,771,838 | A | 9/1988 | Ketcham |
| 4,824,135 | A | 4/1989 | McGregor |
| 5,029,894 | A | 7/1991 | Willman |
| 5,149,121 | A | 9/1992 | Hafner |
| 5,209,693 | A | 5/1993 | Lyman |
| 5,232,271 | A | 8/1993 | Cobble et al. |
| 5,338,204 | A | 8/1994 | Herndon |
| 5,421,600 | A | 6/1995 | Jones et al. |
| 5,434,552 | A | 7/1995 | Ems |
| 5,439,071 | A * | 8/1995 | Rodriguez-Ferre ............ 180/167 |
| 5,558,351 | A | 9/1996 | Hunter |
| 5,644,114 | A | 7/1997 | Neaves |
| 5,810,095 | A | 9/1998 | Orbach et al. |
| 5,816,354 | A | 10/1998 | Watkins |
| 5,859,509 | A | 1/1999 | Bienz et al. |
| 5,861,802 | A | 1/1999 | Hungerink et al. |
| 5,924,910 | A | 7/1999 | Liu |
| 5,995,895 | A | 11/1999 | Watt et al. |
| 6,165,044 | A | 12/2000 | Lamar, Jr. |
| 6,292,094 | B1 | 9/2001 | Deng et al. |
| 6,296,266 | B1 | 10/2001 | Martin |
| 6,419,256 | B1 | 7/2002 | Clark |
| 6,422,330 | B1 | 7/2002 | Harris |
| 6,470,982 | B2 * | 10/2002 | Sitarski et al. ............... 180/65.1 |
| D466,167 | S | 11/2002 | Mullaney et al. |
| 6,481,738 | B1 | 11/2002 | Duncan et al. |
| 6,491,122 | B2 * | 12/2002 | Leitner et al. ................ 180/65.8 |
| 6,494,283 | B1 | 12/2002 | Mullins |
| 6,588,788 | B2 | 7/2003 | Clark |
| 6,672,936 | B1 | 1/2004 | Shaffer |
| 6,771,034 | B2 | 8/2004 | Reile et al. |
| 6,906,639 | B2 | 6/2005 | Lemelson et al. |
| 6,975,932 | B2 | 12/2005 | Obradovich |
| 7,163,213 | B2 | 1/2007 | Chambers |
| 7,165,643 | B2 | 1/2007 | Bozem et al. |
| 7,207,588 | B2 | 4/2007 | Bergum et al. |
| 7,540,519 | B1 | 6/2009 | Coyle |
| 8,141,668 | B2 * | 3/2012 | Huntsberger et al. ........ 180/65.1 |
| 2001/0002451 | A1 | 5/2001 | Breed |
| 2001/0006125 | A1 * | 7/2001 | Richey et al. .................. 180/6.5 |
| 2002/0063047 | A1 | 5/2002 | Burnett |
| 2002/0113564 | A1 | 8/2002 | Reile et al. |
| 2002/0121395 | A1 * | 9/2002 | Norman et al. .............. 180/65.1 |
| 2003/0075372 | A1 | 4/2003 | Kurohori et al. |
| 2004/0154854 | A1 | 8/2004 | Stephens |
| 2006/0131089 | A1 | 6/2006 | Lin |
| 2006/0260877 | A1 | 11/2006 | Ito et al. |
| 2007/0032913 | A1 | 2/2007 | Ghoneim et al. |
| 2008/0011527 | A1 | 1/2008 | Howell et al. |
| 2009/0156094 | A1 | 6/2009 | Seckel et al. |

FOREIGN PATENT DOCUMENTS

| | | |
|---|---|---|
| DE | 3700947 | 7/1988 |
| DE | 29701360 | 4/1997 |
| EP | 0044148 | 1/1982 |
| EP | 1580043 | 9/2005 |
| EP | 2072388 A2 | 6/2009 |
| GB | 2200957 | 8/1988 |
| JP | 11124051 | 5/1999 |

OTHER PUBLICATIONS

Bill Estes, "PullRite: The Ultimate Sway Control," Trailer Life, Dec. 1989, 6 pages, www.pullrite.com.

"70 Degree Pullrite," "90 Degree PullRite," and "Camper Special," 2004, 2 pages, www.pullrite.com.

Pulliam Enterprises, Inc., "The PullRite Principle," 1996, 2 pages, www.pullrite.com.

Office action regarding U.S. Appl. No. 10/966,991, Apr. 28, 2006, 10 pp., U.S. Patent and Trademark Office.

"Notice of Allowance and Fee(s) Due," regarding U.S. Appl. No. 10/966,991, Nov. 21, 2006, 9 pages, U.S. Patent and Trademark Office.

Office action regarding U.S. Appl. No. 11/728,049, Mar. 31, 2008, 7 pages, U.S. Patent and Trademark Office.

Office action regarding U.S. Appl. No. 11/728,049, Oct. 22, 2008, 8 pages, U.S. Patent and Trademark Office.

Office action regarding U.S. Appl. No. 11/728,049, Apr. 10, 2009, 8 pages, U.S. Patent and Trademark Office.

"Notification of Transmittal of the International Search Report and The Written Opinion of the International Searching Authority, or the Declaration," regarding PCT Application No. PCT/US05/17151, Aug. 2, 2006, 8 pages, U.S. Patent and Trademark Office.

Examiner's first report regarding Australian Patent Application No. 2005272998, Jul. 4, 2008, 1 page, Australian Patent Office.

Office action regarding Canadian Patent Application No. 2,574,262, Nov. 6, 2008, 2 pages, Canadian Patent Office.

\* cited by examiner

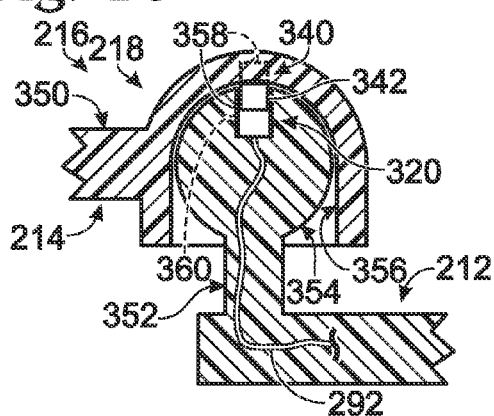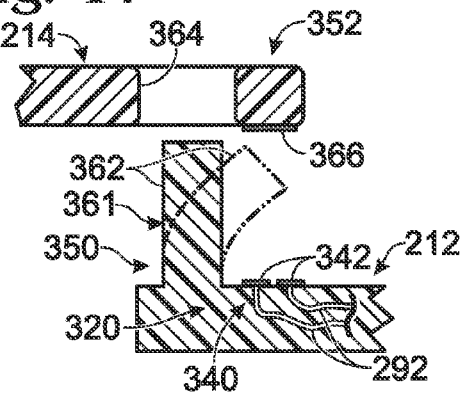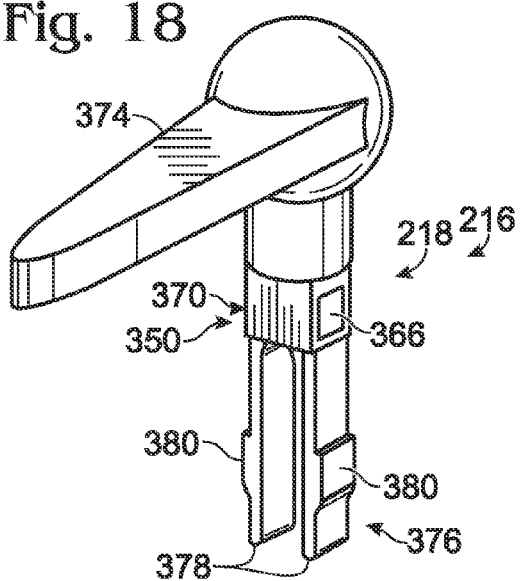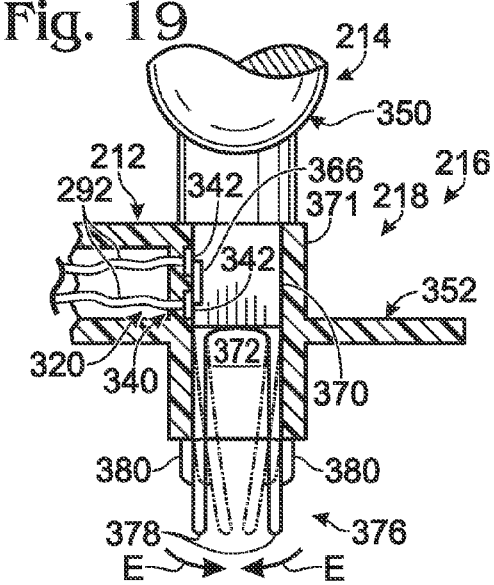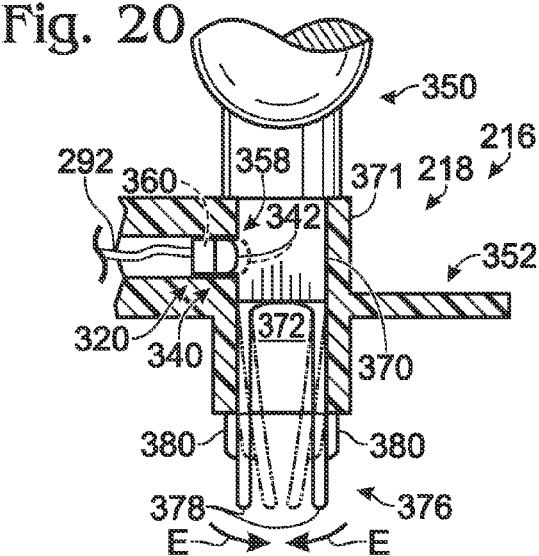

CHILDREN'S RIDE-ON VEHICLES HAVING DETECTION SYSTEMS

CROSS-REFERENCE TO RELATED APPLICATIONS

This application is a continuation-in-part of U.S. patent application Ser. No. 11/728,049, which was filed Mar. 23, 2007 now U.S. Pat. No. 7,621,552 and is entitled "Children's Ride-On Vehicle Assemblies Having Trailing Vehicle Detection Systems," which is a continuation patent application of U.S. patent application Ser. No. 10/966,991, which was filed on Oct. 15, 2004, is entitled "Children's Ride-On Vehicle Assemblies Having Trailing Vehicle Detection Systems," and issued as U.S. Pat. No. 7,207,588, which claims priority to U.S. Provisional Patent Application Ser. No. 60/589,267, which was filed on Jul. 19, 2004 and is entitled "Pinch-Resistant Hitch Assembly and Children's Ride-On Vehicle Assemblies Including the Same." Additionally, this application claims priority to U.S. Provisional Patent Application Ser. No. 61/115,830, which was filed Nov. 18, 2008 and is entitled "Children's Ride-On Vehicles Having Detection Systems." The complete disclosures of the above applications and patent are hereby incorporated by reference for all purposes.

BACKGROUND OF THE DISCLOSURE

The present disclosure is directed to detection systems adapted to detect one or more conditions, such as whether an accessory is coupled to the body of a children's ride-on vehicle, and children's ride-on vehicles including one or more of those systems. Patents and patent application publications that may be related to the present disclosure include U.S. Pat. Nos. 1,358,252; 3,700,059; 4,513,837; 4,522,420; 4,627,633; 4,638,880; 5,029,894; 5,149,121; 5,338,204; 5,421,600; 5,816,354; 5,859,509; 6,165,044; 6,296,266; 6,419,256; 6,494,283; 6,588,788; 7,163,213; 7,165,643; and 7,207,588, and U.S. Patent Application Publication Nos. 2006/0131089 and 2006/0260877. The complete disclosures of the above patents and patent applications are hereby incorporated by reference for all purposes.

SUMMARY OF THE DISCLOSURE

The children's ride-on vehicles may, in some embodiments, include a body having a seat assembly configured to support a child; a plurality of wheels rotatably coupled to the body, wherein the plurality of wheels includes at least one steerable wheel and at least one driven wheel; and a drive assembly adapted to selectively drive rotation of the at least one driven wheel in a plurality of drive configurations. The drive assembly may include a motor assembly comprising at least one electric motor, at least one user input device positioned to receive inputs from a child supported by the seat assembly and adapted to selectively actuate the motor assembly, a battery assembly including at least one battery adapted to selectively energize the motor assembly, and a detection system adapted to detect whether an accessory is coupled to the body. The drive assembly may be adapted to restrict driving of the at least one driven wheel to less than all drive configurations of the plurality of drive configurations based on the detection system detecting whether the accessory is coupled to the body.

BRIEF DESCRIPTION OF THE DRAWINGS

FIG. 7 is a top plan view of a children's ride-on vehicle assembly having a leading vehicle and a trailing vehicle.

FIG. 8 is a side view of the children's ride-on vehicle assembly of FIG. 7.

FIG. 16 is a fragmentary side elevation view showing an illustrative connection apparatus with a trailing vehicle detection system.

FIG. 17 is a fragmentary side elevation view showing an illustrative connection apparatus with a trailing vehicle detection system.

FIG. 18 is a perspective view of an illustrative portion of a connection apparatus.

FIG. 19 is a fragmentary side elevation view showing an illustrative connection apparatus with a trailing vehicle detection system.

FIG. 20 is a fragmentary side elevation view showing an illustrative connection apparatus with a trailing vehicle detection system.

DETAILED DESCRIPTION OF THE DISCLOSURE

Figure 1:
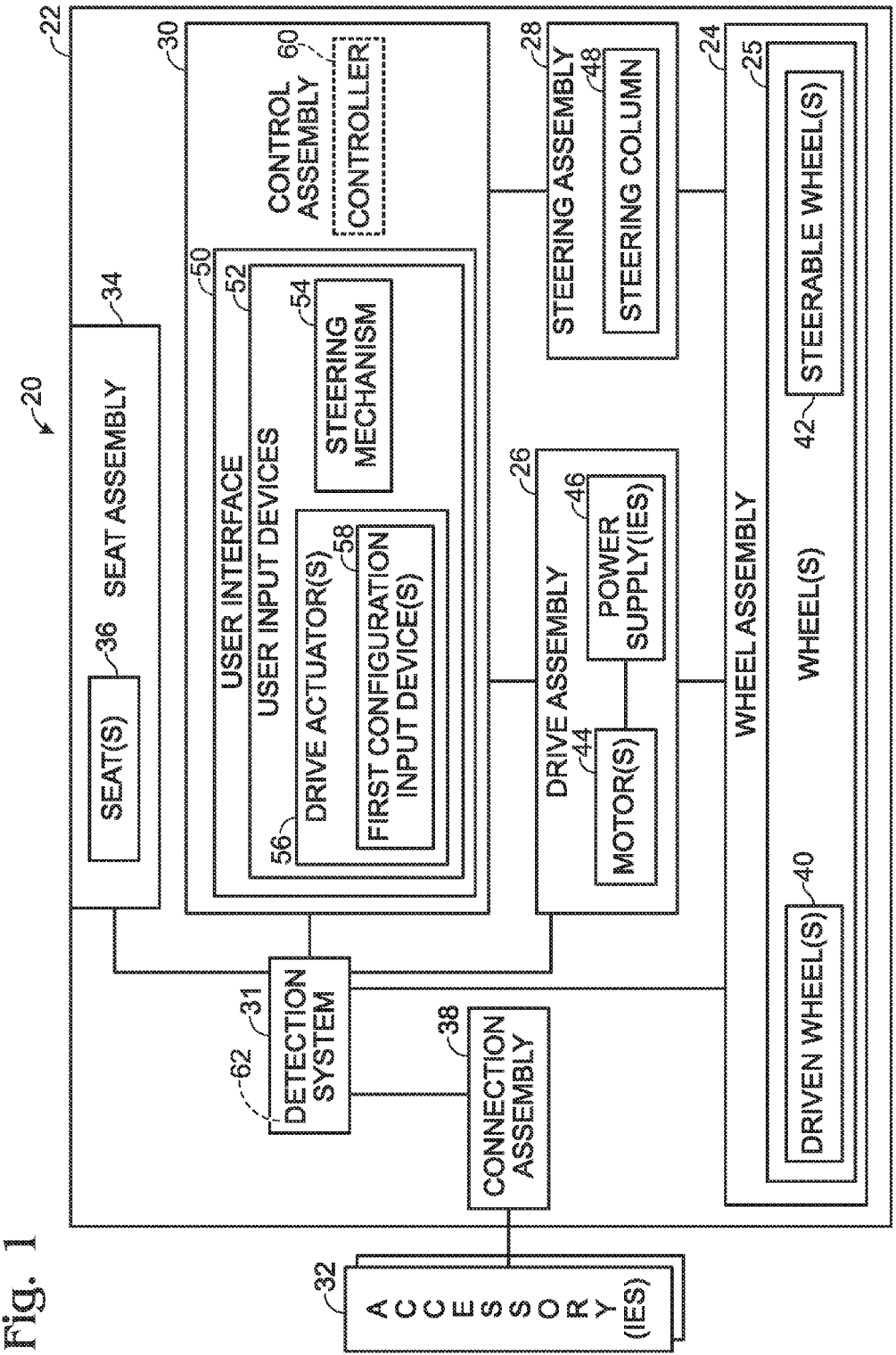
FIG. 1 is a block diagram of a children's ride-on vehicle with a detection system.

The present disclosure is directed to detection systems adapted to detect one or more conditions, such as whether an accessory is coupled to the body of a children's ride-on vehicle, and children's ride-on vehicles including one or more of those systems.

The children's ride-on vehicles may, in some embodiments, include a body having a seat assembly configured to support a child, the seat assembly including a seat configured to be selectively adjusted among a plurality of seat positions; a plurality of wheels rotatably coupled to the body, wherein the plurality of wheels includes at least one driven wheel; and a drive assembly adapted to selectively drive rotation of the at least one driven wheel in a plurality of drive configurations.

The drive assembly may include a motor assembly comprising at least one electric motor, at least one user input device positioned to receive inputs from a child sitting on the seat and adapted to selectively actuate the motor assembly, a battery assembly including at least one battery adapted to selectively energize the motor assembly, and a detection system adapted to detect at least one of seat position, seat usage, and weight supported by the seat. The drive assembly may be adapted to restrict driving of the at least one driven wheel to less than all drive configurations of the plurality of drive configurations based on at least one of the detected seat position, the detected seat usage, and the detected weight supported by the seat.

The children's ride-on vehicles may, in some embodiments, include a body having a seat assembly configured to support a child; a plurality of wheels rotatably coupled to the body, wherein the plurality of wheels includes at least one steerable wheel and at least one driven wheel; a steering assembly comprising a steering mechanism adapted to receive steering inputs from a child supported by the seat assembly, and a steering linkage adapted to convey the steering inputs to the at least one steerable wheel; and a drive assembly adapted to selectively drive rotation of the at least one driven wheel in a plurality of drive configurations.

The drive assembly may include a motor assembly comprising at least one electric motor, at least one user input device positioned to receive inputs from a child supported by the seat assembly and adapted to selectively actuate the motor assembly, the at least one user input device including a configuration input device adapted to receive user inputs selecting amongst the plurality of drive configurations, a battery assembly including at least one battery adapted to selectively energize the motor assembly, and a detection system adapted to detect whether an accessory is coupled to the body.

The drive assembly, responsive to the detection system detecting that the accessory is coupled to the body, may be adapted to (1) restrict driving of the at least one driven wheel to less than all drive configurations of the plurality of drive configurations and (2) disengage the configuration input device from the motor assembly, the configuration input device being unable to selectively actuate the motor assembly when disengaged from the motor assembly, and the steering assembly is adapted to disengage the steering mechanism from the steering linkage responsive to the detection system detecting that the accessory is coupled to the body, the steering linkage being unable to convey the steering inputs from the steering mechanism to the at least one steerable wheel when the steering mechanism is disengaged from the steering linkage.

A block diagram example of a children's ride-on vehicle is shown in FIG. 1 and indicated generally at 20. Children's ride-on vehicle 20 may include any suitable structure configured to allow a child riding on the vehicle to move across any suitable support surface. For example, the children's ride-on vehicle may include a body 22, a wheel assembly 24, a drive assembly 26, a steering assembly 28, a control assembly 30, and a detection system 31.

The body may include any suitable structure configured to support one or more other components of the children's ride-on vehicle and/or one or more accessories 32 of the vehicle. For example, the body may include at least one seat assembly 34 that is sized and configured to accommodate at least one child. Seat assembly 34 may have any suitable configurations.

For example, the seat assembly may include configurations in which the seat assembly includes one or more seats or one or more seating regions.

Vehicle 20 may be sized for use by a child driver. Alternatively, the vehicle may be sized for use by a child driver and a child passenger. For example, seat assembly 34 may include one or more seats or seating regions 36 that are sized and positioned to receive a child driver and/or one or more child passengers. Alternatively, the seat assembly may include only a single seat or seating region. One or more of the seats may be configured to be selectively adjusted among a plurality of seat positions, such as a small-seat position in which the seat is configured to support a child, and a large-seat position in which the seat is configured to support a child larger than the child supported in the small-seat position.

Additionally, body 22 may include one or more connection assemblies 38. The connection assemblies may include any suitable structure configured to support one or more of the accessories. For example, connection assemblies 38 may include connectors, apertures, openings, extensions, and/or other suitable structure configured to couple the accessories to the body.

Body 22 may be formed from any suitable materials. For example, the body may be formed from molded plastic and/or may be integrally formed or formed from a plurality of parts that may be secured together by screws, bolts, clips, and/or other suitable fasteners. Body 22 may additionally, or alternatively, be at least partially formed from other suitable material(s), such as metal, wood, and/or composite materials.

Moreover, the body may be shaped to generally resemble any suitable vehicle. For example, body 22 may be shaped to generally resemble an all-terrain vehicle. Alternatively, the body may be shaped to resemble corresponding full-sized, or adult-sized, vehicles, such as cars, trucks, construction vehicles, emergency vehicles, off-road vehicles, motorcycles, space vehicles, aircrafts, watercrafts, etc. Additionally, or alternatively, body 22 may be shaped to resemble fantasy vehicles that do not have a corresponding adult-sized counterpart.

Wheel assembly 24 may include a plurality of wheels 25 rotatably coupled to the body and/or configured to rotatably support the body on a support surface. For example, the plurality of wheels may include at least one driven wheel 40 and/or at least one steerable wheel 42. "Driven wheel," as used herein, refers to a wheel that is rotated directly in response to a rotational input from the vehicle's drive assembly, which is either directly conveyed to the wheel by the output of the motor(s) or conveyed through linkage, such as a gearbox, belt, chain, gear assembly, axle, etc.

The driven wheel may be configured to be driven by drive assembly 26 at any suitable speed(s) and/or direction(s). Steerable wheel 42 may be configured to be steered by steering assembly 28 toward any suitable direction(s). The wheel assembly may include any suitable number of wheels, such as two wheels, three wheels, four or more wheels.

Any combination of those wheels may be driven and/or steerable. For example, when the plurality of wheels includes two front wheels and two rear wheels, all wheels may be driven (all-wheel drive configuration) with one or more of those wheels being steerable. Alternatively, the two front wheels may be steerable and the two rear wheels may be driven (rear-wheel drive configuration), or vice-versa (front-wheel drive configuration).

In some embodiments, wheel assembly 24 may include one or more tires (not shown in FIG. 1) coupled to the wheels, and/or one or more inner tubes (not shown). At least a portion of the inner tubes may be disposed between the wheel and the tire. The tires and/or inner tubes may be on each of the wheels or on less than all of the wheels. For example, only the front and/or rear wheel(s) may have tires and/or inner tubes. In some embodiments, a wheel, a tire coupled to the wheel, and an inner tube may be referred to as a "tire system."

When the wheel assembly includes one or more inner tubes, the wheel assembly also may include a system for preventing overinflation of inner tubes. An example of such a system is described in U.S. patent application Ser. No. 12/355,588 entitled "Systems for Preventing Overinflation of Inner Tubes," which was filed on Jan. 16, 2009. The complete disclosure of that application is hereby incorporated by reference for all purposes.

Drive assembly 26 may include any suitable structure configured to selectively drive the rotation of the at least one driven wheel. For example, the drive assembly may include at least one motor 44 and at least one power supply 46. The motor may be configured to drive the rotation of at least one of the driven wheels of the plurality of wheels. The motor may be described as providing an output that provides a rotational input to the driven wheel(s). The output may include one or more of a rotating shaft and/or a rotation pinion or output gear.

The drive assembly may include any suitable number of motors 44. For example, the drive assembly may include a single motor to drive the driven wheels. Alternatively, the drive assembly may include two motors where a first motor may drive a subset of the plurality of wheels, such as a first pair of a front wheel and a rear wheel, while a second motor may drive another subset of the plurality of wheels, such as a second pair of a front wheel and a rear wheel. Alternatively, drive assembly 26 may include more than two motors.

Motor 44 may additionally power other moveable components of vehicle 20. For example, the motor may power one or more components of a mechanical assembly (not shown). In some embodiments, the motor may move one or more mechanical members of the mechanical assembly. For example, the motor may move one or more of the mechanical members between extended and/or retracted positions.

An example of a children's ride-on vehicle with one or more mechanical assemblies is shown in U.S. patent application Ser. No. 12/289,775 entitled "Children's Ride-On Vehicles Having Mechanical Assemblies," which was filed on Feb. 20, 2009. The complete disclosure of that application is hereby incorporated by reference for all purposes.

Power supply 46 may include any suitable structure configured to provide power to the drive assembly. For example, the power supply may include one or more rechargeable batteries, capacitors, etc. Power supply 46 may be operably connected to the motor by any suitable electrical connectors, such as cables, wires, positive and negative terminals or leads, etc.

The drive assembly may additionally, or alternatively, be configured to receive driving inputs from a user, such as via control assembly 30, and to convey those driving inputs to the plurality of wheels. When the power supply includes one or more batteries, the drive assembly may be referred to as a "battery-powered drive assembly."

Although drive assembly 26 is shown to include motor 44 and power supply 46, the drive assembly may additionally, or alternatively, include any suitable components and/or assemblies configured to selectively drive the rotation of the at least one driven wheel. For example, drive assembly 26 may include a motor output linkage that transmits the rotational input from the motor's output(s) to the driven wheels. The linkage may include an intermediate linkage between the output and the driven wheel(s), such as a gearbox containing one or more gears, a belt or chain drive, a worm gear, one or more individual gears, etc.

Additionally, or alternatively, the motor output linkage may be configured to transmit the rotational input from the motor(s) to the driven wheel(s) at the same relative rate of rotation, or it may mechanically augment the rotational input to convey a greater or lesser rate of rotation relative to the rate of rotation of the output of the motor(s). Alternatively, the drive assembly may be formed without the motor output linkage, in which case the output(s) of the motor(s) may directly transmit the rotational input to the driven wheel(s).

Steering assembly 28 may include any suitable structure configured to selectively steer the at least one steerable wheel. For example, the steering assembly may include at least one steering column 48 and/or other mechanical linkage that receives steering inputs from control assembly 30 and steers one or more of the steerable wheels based, at least in part, on the steering inputs. The steering column may, for example, include an end portion distal the steering mechanism, with that end portion being coupled via a suitable tie rod or steering linkage, to steering collars, or steering levers, associated with one or more steerable wheels.

Control assembly 30 may include any suitable structure configured to receive user inputs and/or to convey those inputs to drive assembly 26 and/or steering assembly 28. For example, control assembly 30 may include a user interface 52 configured to receive user inputs, such as driving and/or steering inputs. The user interface may include one or more user control devices or user input devices 52. For example, the user input devices may include a steering mechanism 54, which may be any suitable structure configured to steer one or more of the steerable wheels via user-applied steering inputs to the steering mechanism. The steering mechanism may, for example, be in the form of steering wheel(s), handlebar(s), and/or steering lever(s).

Additionally, user input devices 52 may include one or more drive actuators 56, which may include any suitable structure configured to selectively energize the motor(s) responsive to a user input directing the power supply(ies) to actuate or otherwise energize the motor(s). For example, the drive actuators may include an on/off switch, a foot pedal, a throttle lever, and a rotational handgrip on a steering mechanism that includes a handlebar.

The user inputs, such as those conveyed via one or more of the drive actuators, may be adapted to select, or configure, the drive assembly within a plurality of drive configurations. Those user inputs may be referred to as configuration inputs and may be adapted to enable, or select, one or more of a plurality of drive configurations. Similarly, the drive actuator(s) utilized to receive the configuration inputs from a user, such as a child sitting on the ride-on vehicle's seat, may be referred to as configuration input devices, such as first configuration input device(s) 58. In other words, the first configuration input device(s) may be adapted to receive user inputs selecting amongst a plurality of drive configurations.

The plurality of drive configurations may be realized, or implemented, when the motor(s) is energized, such as responsive to actuation/energization of the motor(s) by the battery(ies). For example, the plurality of drive configurations may include one or more of the direction (forward or reverse) in which the drive assembly may propel the vehicle upon energization of the motor(s), the relative speed or range of speed which the motor(s) may be configured/energized to provide, and/or whether the drive assembly may be able to be actuated responsive to an actuation input to drive actuator 56.

For example, speed drive configurations, such as "high" and "low" speed configurations, "high," "medium," and "low" speed configurations, etc., may be selected with one or more drive actuators, such as in the form of a speed switch. Those speed drive configurations may be realized (i.e., the vehicle may be propelled according to the selected speed drive configuration) upon actuation or energization of the motor(s). The speed drive configurations may include a plurality of relative speed configurations, such as a first speed configuration, a second speed configuration that is greater than the first speed configuration, and optionally at least a third or more speed configurations that is/are greater than the second speed configuration.

As another example, direction drive configurations, such as forward and reverse drive configurations, may be selected by drive actuator 56, such as in the form of a direction switch. The direction switch may enable a user to select the relative direction (i.e., clockwise or counterclockwise) of rotation and thereby configure the vehicle to drive in forward and reverse directions upon energization of the motor(s).

A further example of drive configurations may be referred to as power configurations and may relate to whether or not the drive assembly's motor(s) is in an energized state in which the electric motor(s) may be driving the rotation of the driven wheel(s), or a de-energized state in which the motor(s) may not be driving the rotation of the driven wheel(s). In other words, when in the de-energized drive configuration, the motor(s) does not drive the rotation of the ride-on vehicle's driven wheel(s).

As an example, the drive assembly may be selectively configured from a de-energized drive configuration to an energized drive configuration responsive to a user, such as a child sitting on a seat of the ride-on vehicle, actuating one or more of the drive actuators. As discussed, this may include pressing or otherwise manipulating a throttle lever or button, or depressing a foot pedal.

The drive assembly may include any suitable structure to selectively enable the plurality of drive configurations. For example, different voltages may be applied to the motor(s) by reversing the polarity of the battery(ies) relative to the motor(s), which may switch between forward and reverse drive configurations. As another example, different voltages may be applied to the motors by switching two or more batteries and/or two or more motors between series and parallel configurations, which may lead to different relative speed configurations.

For example, when a single 12-volt battery is used with two motors, the motors may be switched between a series configuration in which 6 volts are applied to each of the two motors, and a parallel configuration in which 12 volts are applied to each of the two motors. Additionally, or alternatively, the polarity of the single battery may be reversed such that −6 volts (and/or −12 volts) are applied to each of the two motors. Alternatively, or additionally, the single battery may be disconnected from the two motors, which may be referred to as 0 volts being applied to each of the two motors.

In some embodiments, at least some of the plurality of voltages that may be applied to the electric motor(s) may correspond to a different drive configuration of the drive assembly when that voltage is applied to the electric motor(s). For example, the plurality of voltages may include a low forward voltage, a high forward voltage, a reverse voltage, and a braking voltage.

The low forward voltage may correspond, when applied to the electric motor(s), to a low forward drive configuration in which the electric motor(s) are adapted to drive the rotation of the driven wheel(s) in a forward direction at a first speed. In contrast, the high forward voltage may correspond, when applied to the electric motor(s), to a high forward drive configuration in which the electric motor(s) are adapted to drive the rotation of the driven wheel(s) in the forward direction at a second speed that is greater than the first speed.

The reverse voltage may correspond, when applied to the electric motor(s), to a reverse drive configuration in which the electric motor(s) are adapted to drive the rotation of the driven wheel(s) in a reverse direction. In contrast, the braking voltage may correspond, when applied to the electric motor(s), to a braking drive configuration in which the electric motor(s) are adapted not to (or is unable to) drive the rotation of the driven wheel(s).

As a further example, gears or similar mechanical structures may be utilized to configure relative speed configurations. As yet another example, a microprocessor or other controller may enable the configurations via predetermined programming. Continuing this example, relative speed configurations may be achieved through pulse-width modulation, or other duty cycle ramping, of the energization of the electric motor(s).

Although particular drive configurations are discussed, other suitable drive configurations are included in the present disclosure. Similarly, the drive assembly may be configured, such as responsive to user inputs to the user input devices, to a drive configuration that includes more than one of the illustrative configurations described above. For example, a vehicle may be configured to such configurations as a low-speed forward configuration, a high-speed forward configuration, a low-speed reverse configuration, a high-speed reverse configuration, a medium-speed forward configuration, a medium-speed reverse configuration, etc.

The implementation of one or more selected drive configurations may occur prior to, simultaneous with, or after receipt of the configuration input(s). For example, a child may, via one or more configuration inputs, select a particular speed and/or direction drive configuration and thereafter, via an actuation input, drive the vehicle according to the selected drive configuration(s). As another example, a child may be driving the vehicle according to a particular drive configuration(s) and thereafter, via one or more configuration inputs, select a different drive configuration(s), such as a different direction or speed configuration. As yet another example, a user input device may provide both actuation and configuration inputs so that actuating the user input device both selects and implements one or more drive configurations.

User input devices 52 also may include audiovisual actuators (not shown), which may include any suitable structure configured to selectively operate an audiovisual system responsive to user input. For example, the audiovisual actuators may include an on/off switch, a volume switch, an operating mode switch, a selector switch, etc.

The user input devices may be positioned in any suitable portion(s) of the body, such as positioned to receive inputs from a child sitting on the at least one seat. For example, the user input devices may be located in any suitable location within or near the seat so that a child sitting on seat 36 may reach those devices while positioned to operate the vehicle, such as while having at least one hand on the steering mechanism.

In some embodiments, control assembly 30 may include a controller 60, which may control the operation of the drive assembly responsive to at least one of received user inputs and predetermined programming. As an example, controller 60 may be adapted to control electronically the transmission of a user-selected speed to the driven wheel(s) and/or to configure the drive assembly to the user-selected drive configuration.

Controller 60 may include a microprocessor or suitable control circuit. In the context of configuring the drive assembly to a selected drive configuration, the controller may be adapted to selectively enable or disable selected ones of the plurality of drive configurations responsive to user inputs, such as via user input devices 52, predetermined programming, and/or inputs from other sensors or switches.

When controller 60 is adapted to regulate the energization of the motor(s), it may regulate electronically the rotational input transmitted by the motor(s) to the driven wheel(s). For example, controller 60 may regulate at least one of the timing and the ramp, or rate, of application of the transmission of the rotational input after actuation of a corresponding user input device by a child sitting on seat 36. In other words, the controller may be configured to delay in at least time and/or rate of transmission the rotational input to the driven wheel assembly responsive at least in part to a user input selecting the desired, or selected, rotational input. An example of a suitable controller is disclosed in U.S. Pat. No. 6,771,034, the complete disclosure of which is hereby incorporated by reference for all purposes.

In some embodiments, controller 60 may selectively control the transmission of the selected rotation input (such as determined by the selected speed configuration and/or actuation input). In other words, controller 60 may be configured to control the transmission of the selected rotational input in certain situations, such as when certain parameters or thresholds are satisfied. For example, controller 60 may regulate the transmission of rotational input only when the selected rotational input occurs when the ride-on vehicle is already being driven (such as during a user-selected change in speed or direction), when the ride-on vehicle is already traveling at more than a predetermined speed (actual or selected), and/or when the ride-on vehicle changes direction.

The control assembly may be referred to as being configured to be in control communication with the drive and/or steering assemblies. "Control communication," as used herein, refers to the control assembly being physically connected, remotely connected, and/or connected in other suitable way(s) to allow the control assembly to convey user inputs to one or more other components of the children's ride-on vehicle, such as the drive and/or steering assemblies. Although control assembly 30 is shown to convey user inputs to drive assembly 26 and steering assembly 28, the control assembly may additionally, or alternatively, convey user inputs to other components of the children's ride-on vehicle.

Although children's ride-on vehicle 20 is shown to include body 22, wheel assembly 24, drive assembly 26, steering assembly 28, and control assembly 30, the children's ride-on vehicle may additionally, or alternatively, include any suitable structure configured to allow the children's ride-on vehicle to move across any suitable surface.

The children's ride-on vehicle also may include a detection system 31, which may include any suitable structure adapted to detect one or more conditions. The drive, steering, and/or other assemblies of the vehicle may be adapted to affect operation of the vehicle based, at least in part, on the detected conditions. For example, the detection system may be adapted to detect whether one or more accessories 32 are coupled to the body, such as one or more accessories 32 coupled or connected to the body via, for example, connection assembly 38.

The drive assembly may be adapted to automatically restrict, or disable, at least one of the plurality of drive configurations. In other words, drive assembly 26 may be adapted to restrict driving one or more of the driven wheels to less than all drive configurations of the plurality of drive configurations based on the detection system detecting whether the accessory is coupled to the body.

For example, the drive assembly may be adapted to restrict driving one or more of the driven wheels to less than all drive configurations of the plurality of drive configurations responsive to the detection system detecting that the one or more accessories are not coupled to (or uncoupled from) the body. In other words, when the accessory(ies) are coupled to the body, a plurality of drive configurations, such as those discussed above, may be available and may be selected (such as via user inputs) and may be realized or implemented (such as via inputs to drive actuator(s) 56).

However, when the accessory(ies) are not coupled to (or uncoupled from) the body, only a subset (i.e., less than all) of the plurality of drive configurations may be available. By "available," it is meant that the drive assembly may be restricted or prevented from implementing one or more of the plurality of drive configurations.

Alternatively, the drive assembly may be adapted to restrict driving one or more of the driven wheels to less than all drive configurations of the plurality of drive configurations responsive to the detection system detecting that the one or more accessories are coupled to the body. In other words, when the accessory(ies) are not coupled to (or uncoupled from) the body, a plurality of drive configurations, such as those discussed above, may be available and may be selected and may be realized or implemented. However, when the accessory(ies) are coupled to the body, less than all of the plurality of drive configurations may be available.

Additionally, or alternatively, the drive, steering, and/or other assemblies of the vehicle may be adapted to disengage one or more user input devices 52, such as one or more first configuration input devices 58. When disengaged, the user input device(s) may be unable to perform its function(s). When the user input device is, for example, a drive actuator, the drive actuator may be unable to selectively actuate the motor assembly when disengaged.

For example, where the user input devices include first configuration input device 58 that is adapted to receive user inputs selecting amongst the plurality of drive configurations, the drive assembly may be adapted to disengage the first configuration input device from the motor assembly responsive to the detection system detecting that the accessory is coupled (or not coupled) to the body. The first configuration input device may be unable to selectively actuate the motor assembly when disengaged from the motor assembly.

Additionally, or alternatively, where the user input devices include a steering mechanism adapted to receive steering inputs from a child supported by the seat assembly, the steering assembly may be adapted to disengage the steering mechanism from the steering linkage responsive to the detection system detecting that the accessory is coupled (or not coupled) to the body. The steering linkage may be unable to convey steering inputs from the steering mechanism to one or more of the steerable wheels when the steering mechanism is disengaged from the steering linkage.

Detection system 31 may additionally, or alternatively, detect one or more conditions of seat assembly 34. The drive and/or steering assembly may be adapted to affect operation of the vehicle based, at least in part, on the detected condition(s) of the seat assembly. For example, the drive assembly may be adapted to restrict driving of one or more driven wheels to less than all drive configurations of the plurality of drive configurations responsive to the detected seat usage. Alternatively, or additionally, the drive assembly and/or steering assembly may be adapted to disengage one or more user input devices based on the detected seat usage.

For example, the detection system may be adapted to detect the selected seat position of one or more of the seats of seat assembly 34. The drive assembly may be adapted to restrict driving one or more of the driven wheels to less than all drive configurations of the plurality of drive configurations based on the selected seat position.

For example, the drive assembly may be adapted to restrict driving one or more of the driven wheels to less than all drive configurations of the plurality of drive configurations responsive to the detection system detecting that the seat is in the small-seat position. In other words, when the seat is in the large-seat position, a plurality of drive configurations, such as those discussed above, may be available and may be selected and may be realized or implemented. However, when the seat is in the small-seat position, less than all of the plurality of drive configurations may be available.

Alternatively, or additionally, detection system 31 may be adapted to detect usage of one or more seats by a child. The drive assembly may be adapted to restrict driving one or more of the driven wheels to less than all drive configurations of the plurality of drive configurations based on the detected seat usage.

For example, the drive assembly may be adapted to restrict driving one or more of the driven wheels to less than all drive configurations of the plurality of drive configurations responsive to the detection system detecting that the seat is not being used by a child. In other words, when the detection system detects that the seat is being used by a child, a plurality of drive configurations, such as those discussed above, may be available and may be selected and may be realized or implemented. However, when the detection system does not detect that the seat is being used by a child, less than all of the plurality of drive configurations may be available.

In some embodiments, the drive assembly may be adapted to restrict driving of one or more of the driven wheels to a de-energized drive configuration of the plurality of drive configurations responsive to the detection system detecting a lack of seat usage. In other words, the drive assembly may be inoperable or unable to power the driven wheels when the detection system fails to detect that the seat is being used by a child.

Additionally, or alternatively, detection system 31 may be adapted to detect weight of a child being supported by the seat assembly. The drive assembly may be adapted to restrict driving one or more of the driven wheels to less than all drive configurations of the plurality of drive configurations based on the detected weight.

For example, the drive assembly may be adapted to restrict driving one or more of the driven wheels to less than all drive configurations of the plurality of drive configurations responsive to a detected weight that exceeds a predetermined maximum weight. In other words, when the detection system detects that the weight of a child being supported by the seat assembly is at or below a predetermined maximum weight, a plurality of drive configurations, such as those discussed above, may be available and may be selected and may be realized or implemented. However, when the detection system detects that the weight of a child being supported by the seat assembly is above a predetermined maximum weight, less than all of the plurality of drive configurations may be available.

In some embodiments, the drive assembly may be adapted to restrict driving of one or more of the driven wheels to a de-energized drive configuration of the plurality of drive configurations responsive to the detection system detecting that a weight of a child being supported by the seat assembly is above the predetermined maximum weight. In other words, the drive assembly may be inoperable or unable to power the driven wheels when the detection system detects that the seat assembly is supporting a child who weighs above the predetermined maximum weight.

Alternatively, or additionally, the drive assembly may be adapted to restrict driving one or more of the driven wheels to less than all drive configurations of the plurality of drive configurations responsive to a detected weight that fails to meet a predetermined minimum weight. In other words, when the detection system detects that the weight of a child being supported by the seat assembly is at or above a predetermined minimum weight, a plurality of drive configurations, such as those discussed above, may be available and may be selected and may be realized or implemented. However, when the detection system detects that the weight of a child being supported by the seat assembly is below a predetermined minimum weight, less than all of the plurality of drive configurations may be available.

In some embodiments, the drive assembly may be adapted to restrict driving of one or more of the driven wheels to a de-energized drive configuration of the plurality of drive configurations responsive to the detection system detecting that a weight of a child being supported by the seat assembly is below the predetermined minimum weight. In other words, the drive assembly may be inoperable or unable to power the driven wheels when the detection system detects that the seat assembly is supporting a child who weighs below the predetermined minimum weight.

Detection system 31 may additionally, or alternatively, detect one or more other conditions. The steering, driving, and/or other assemblies of the vehicle may be adapted to affect operation of the vehicle based, at least in part, on the detected condition(s). For example, the detection system may be adapted to detect an orientation of the body of the vehicle relative to a horizontal plane. The drive assembly may be adapted to restrict driving one or more of the driven wheels to less than all drive configurations of the plurality of drive configurations based on the detected orientation. Alternatively, or additionally, the drive and/or steering assembly may be adapted to disengage one or more user input devices based on the detected orientation.

For example, the drive assembly may be adapted to restrict driving one or more of the driven wheels to less than all drive configurations of the plurality of drive configurations responsive to a detected orientation that deviates beyond a predetermined maximum degree or angle. In other words, when the detection system detects that an orientation of the body relative to a horizontal plane is at or below a predetermined angle, a plurality of drive configurations, such as those discussed above, may be available and may be selected and may be realized or implemented. However, when the detection system detects that an orientation of the body relative to a horizontal plane is above a predetermined maximum angle, less than all of the plurality of drive configurations may be available.

In some embodiments, the drive assembly may be adapted to restrict driving of one or more of the driven wheels to a de-energized drive configuration of the plurality of drive configurations responsive to the detection system detecting that an orientation of the body relative to a horizontal plane is above the predetermined maximum angle. In other words, the drive assembly may be inoperable or unable to power the driven wheels when the detection system detects that the body has tilted beyond the predetermined maximum angle.

The restriction of the plurality of drive configurations to less than all of the plurality of drive configurations may be accomplished through any suitable and/or mechanical devices. Preferably, that restriction occurs regardless of user inputs that otherwise would select and implement the selected drive configuration. Furthermore, the restriction of one or more of the plurality of available drive configurations and the return to the plurality of available drive configurations preferably occurs automatically responsive to the detected conditions.

Although detection system 31 is described to detect particular conditions, the detection system may additionally, or alternatively, detect other conditions. For example, the detection system may detect ambient conditions, such as ambient temperature, ambient light, etc. Additionally, although drive assembly 26 is described to be adapted to restrict driving of one or more driven wheels to less than all drive configurations of the plurality of drive configurations responsive to the detected condition(s) by the detection system, the drive assembly may alternatively, or additionally, reduce speed attainable at each of the plurality of drive configurations.

For example, baseline speeds provided by the drive assembly may be reduced by a predetermined increment responsive to the detected condition(s) by the detection system, such as via controller 60. The drive assembly may, for example, slow the vehicle via dynamic braking, responsive to the detected condition(s). For example, when training wheels are attached to the vehicle, the vehicle may be slowed if the motor ceases to be powered by the power supply. However, when the training wheels are not attached, the vehicle may be able to coast at any speed if the motor ceases to be powered.

Figure 2:
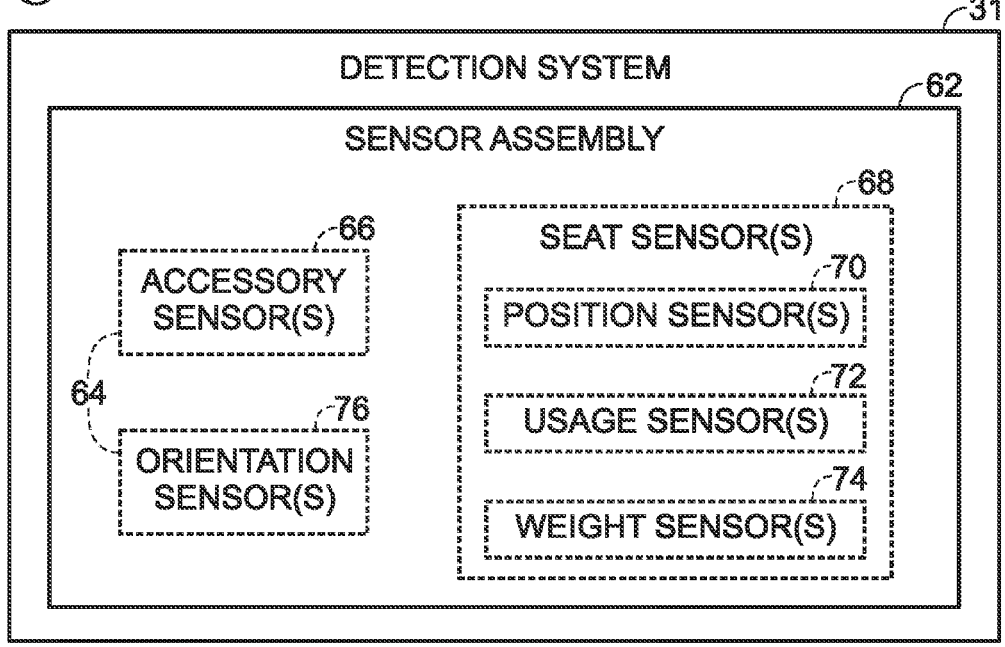
FIG. 2 is a block diagram of the detection system of the children's ride-on vehicle of FIG. 1.
Figure 3:
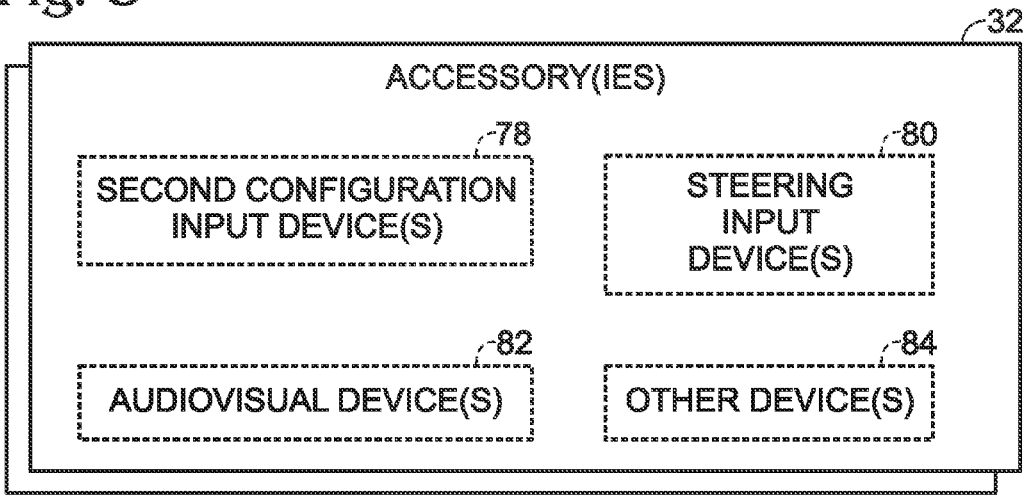
FIG. 3 is a block diagram of an accessory of the children's ride-on vehicle of FIG. 1.

Detection system 31 may include any suitable structure. For example, the detection system may include a sensor assembly 62, as shown in FIG. 2. The sensor assembly may include one or more sensors 64 adapted to detect one or more conditions. For example, sensor assembly 62 may include one or more accessory sensors 66, which may be adapted to detect whether one or more accessories 32 are coupled to the body, such as via connection assembly 38.

Additionally, or alternatively, sensor assembly 62 may include one or more seat sensors 68, which may be adapted to detect one or more conditions of the seat assembly. For example, seat sensors 68 may include one or more position sensors 70, which may be adapted to detect selected seat position of the seat(s) of the seat assembly. Additionally, or alternatively, seat sensors 68 may include one or more usage sensors 72, which may be adapted to detect usage (and/or lack of usage) of the seat(s) of the seat assembly. Alternatively, or additionally, seat sensors may include one or more weight sensors 74, which may be adapted to detect weight supported by the seat(s) of the seat assembly.

Sensor assembly 62 also may include one or more orientation sensors 76, which may be adapted to detect orientation of the body of the vehicle relative to a horizontal plane. The sensor assembly may additionally, or alternatively, include any suitable types of sensors, such as sensors to detect ambient conditions, sensors to detect operating temperature of one or more components of the vehicle (such as the motor), sensors to detect applied voltage to the motor, etc.

Examples of the sensors discussed above may include one or more of an electrical sensor, an optical sensor, a mechanical sensor, conductive contacts, a magnetic sensor, and/or other suitable sensing and/or measuring device. When vehicle 20 includes a controller, the sensor assembly may communicate with the controller. An example of an orientation sensor is shown in U.S. patent application Ser. No. 11/510,226 entitled "Children's Ride-On Vehicles Having Ground Detection Systems," which was filed on Aug. 24, 2006. The complete disclosure of that application is hereby incorporated by reference for all purposes.

Accessories 32 may include any suitable structure configured to enhance a child's experience with the vehicle. For example, accessories 32 may include one or more second configuration input device(s) 78 adapted to receive user inputs selecting amongst the plurality of drive configurations. The second configuration input device(s) may be positioned, when the accessory is coupled to the body, to receive inputs selecting amongst the plurality of drive configurations from a user other than a child supported by the seat assembly. In other words, the accessory and/or the second configuration input device(s) may be positioned outside the reach of a child supported by the seat assembly.

The drive assembly may be adapted to disengage the first configuration input device from the motor assembly responsive to the detection system detecting that the accessory with the second configuration input device(s) is coupled to the body. That disengagement allows for selecting a drive configuration from the plurality of drive configurations from only the second configuration input device(s) and not from the first configuration input device. Alternatively, the drive assembly may receive inputs from both the first and second configuration input devices when the accessory is coupled to the body.

Accessories 32 may additionally, or alternatively, include one or more steering input device(s) 80 adapted to receive steering inputs. The steering input device(s) may be positioned, when the accessory is coupled to the body, to receive steering inputs from a user other than a child supported by the seat assembly. In other words, the accessory and/or the steering input device(s) may be positioned outside the reach of a child supported by the seat assembly.

The steering assembly may be adapted to disengage the steering mechanism from the steering linkage responsive to the detection system detecting that the accessory is coupled to the body. That disengagement allows for steering the vehicle from only the steering input device(s) and not from the steering mechanism. Alternatively, the steering assembly may receive steering inputs from both the steering mechanism and the steering input device(s) when the accessory is coupled to the body.

Accessories 32 may alternatively, or additionally, include one or more audiovisual devices 82, which may be adapted to receive one or more audio and/or visual inputs and/or generate one or more audio and/or visual outputs. The audiovisual devices may be actuated by any suitable means, such as via one or more user input devices 52, drive assembly 26, and/or control assembly 30.

An example of an audiovisual system is shown in U.S. patent application Ser. No. 12/361,832 entitled "Operational-State Responsive Audiovisual System," which was filed on Jan. 29, 2009. The complete disclosure of that application is hereby incorporated by reference for all purposes. The accessories may additionally, or alternatively, include one or more other devices 84, such as bubble generators, fog generators, etc.

Figure 4:
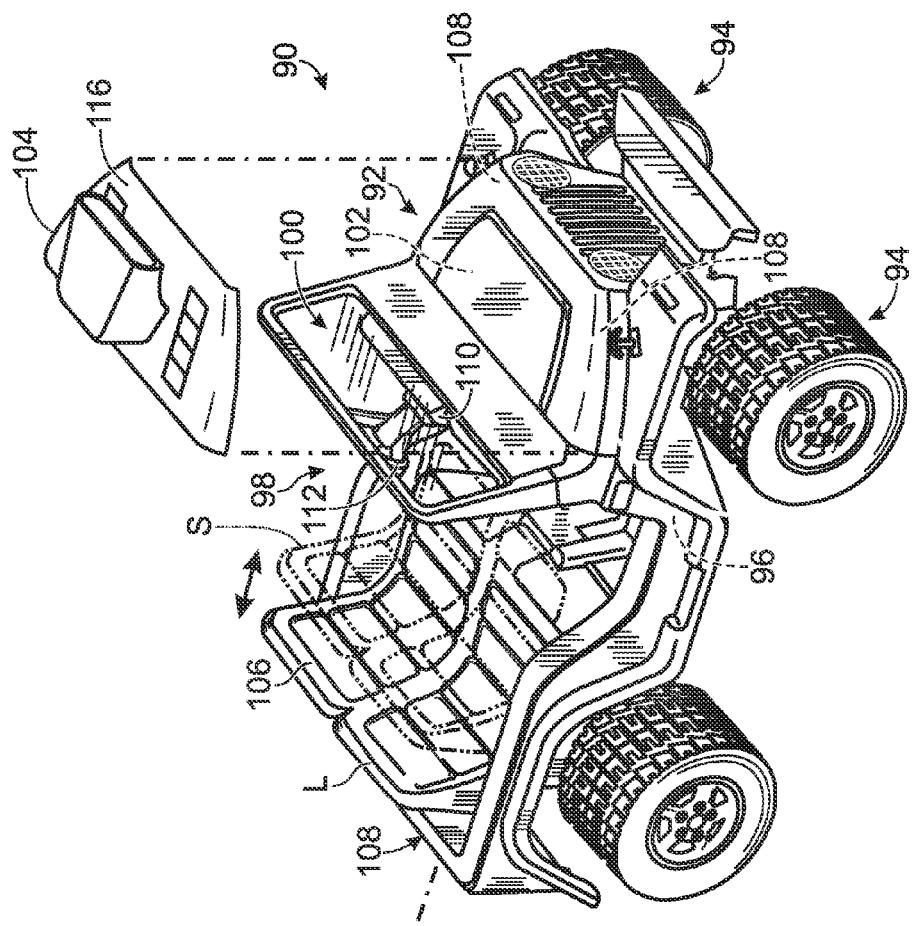
FIG. 4 is an isometric view of a children's ride-on vehicle with a detection system showing examples of accessories.
Figure 4:
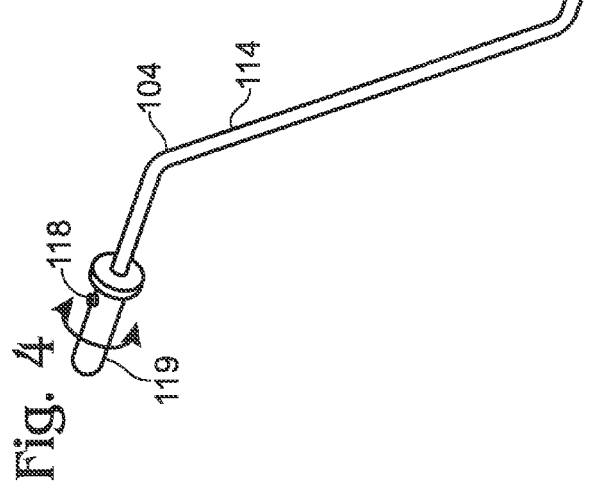
Figure 5:
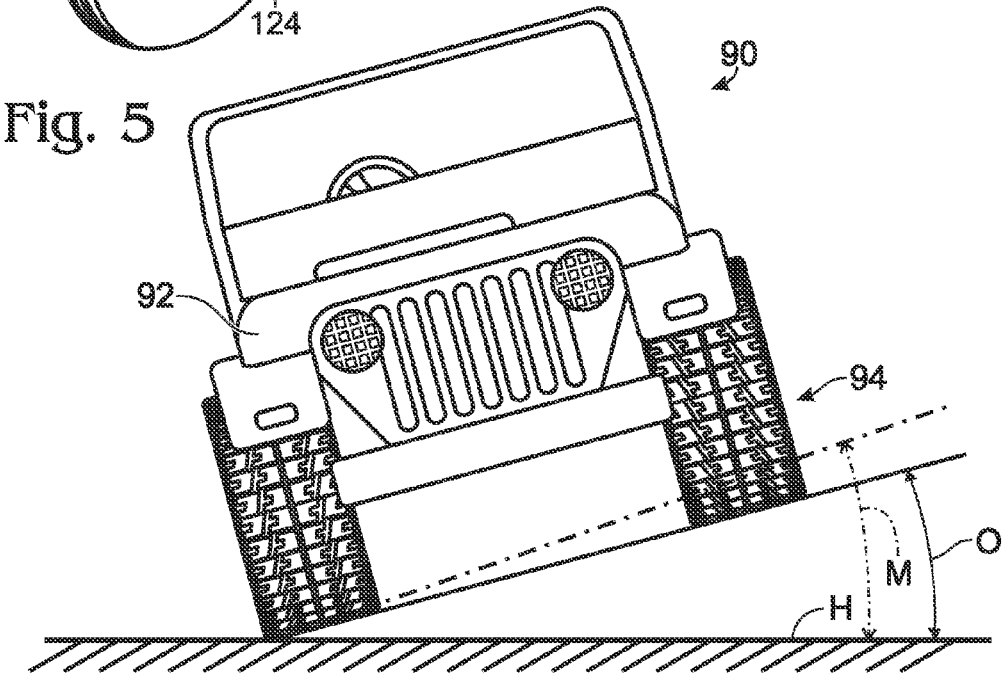
FIG. 5 is a front view of the children's ride-on vehicle of FIG. 4 shown with a detection system configured to detect orientation of the vehicle relative to a horizontal plane.

An example of children's ride-on vehicle 20 is shown in FIGS. 4 and 5, and is generally indicated at 90. Unless otherwise specified, children's ride-on vehicle 90 may include one or more components and/or one or more functions of the components of other children's ride-on vehicles described in the present disclosure. Children's ride-on vehicle 90 may include a body 92, a wheel assembly 94, a drive assembly 96, a steering assembly 98, a control assembly 100, a detection system 102, and accessories 104.

The body may include at least one seat 106 and a connection assembly 108. The seat may be configured to be selectively adjusted between a small-seat position S in which the seat is configured to support a child, and a large-seat position L in which the seat is configured to support a child larger than the child supported in the small-seat position. Connection assembly 108 may include any suitable structure configured to receive or attach to one or more of the accessories.

Control assembly 100 may include a steering wheel 112 and a gear selector 114. The steering wheel may be configured to receive steering inputs from a user. The gear selector may be configured to allow a user to select a drive configuration among a plurality of drive configurations of the drive assembly.

Detection system 102 may include any suitable structure configured to detect whether the accessories are coupled to the body, such as via connection assembly 108. Drive assembly 96 may be adapted to restrict driving of one or more driven wheels of the wheel assembly to less than all drive configurations of a plurality of drive configurations based on whether the accessory(ies) are coupled to the body. Additionally, or alternatively, drive assembly 96 may be adapted to disengage the gear selector from a motor of the vehicle responsive to the detection system detecting that the accessory(ies) are coupled (or not coupled) to the body. Alternatively, or additionally, the steering assembly 98 may be adapted to disengage the steering wheel from one or more steerable wheels of the wheel assembly responsive to the detection system detecting that the accessory(ies) are coupled (or not coupled) to the body.

Additionally, or alternatively, the detection system may detect an orientation O of the vehicle relative to a horizontal plane H, as shown in FIG. 5. Drive assembly 96 may be adapted to restrict driving of one or more driven wheels of the wheel assembly to less than all drive configurations of a plurality of drive configurations based on the detected orientation, such as whether the detected orientation deviates beyond a predetermined maximum angle M. Additionally, or alternatively, the drive and/or steering assemblies may disengage the gear selector and/or steering wheel as described above. Although detection system 102 is shown to detect tilting of the vehicle to its right side, the detection system may additionally detect tilting of the vehicle to its left side, front side, rear side, and/or any suitable combinations.

Accessories 104 may include a parent-assist handle 114 and an alternative hood 116, as shown in FIG. 4. The accessories may be selectively coupled and uncoupled from the body of the vehicle via connection assembly 108.

Parent-assist handle 114 may include a power selector 118 and a steering selector 119. The vehicle may be configured to be controlled via the parent-assist handle when coupled to the body. For example, when the parent-assist handle is coupled to the body, a parent may select a drive configuration from a plurality of drive configurations via the power selector. Additionally, or alternatively, the parent may steer the vehicle via the steering selector, such as by rotating the steering selector toward the desired direction.

In some embodiments, coupling of the parent-assist handle to the body of the vehicle, disengages one or more user input devices of the vehicle, such as the gear selector and steering wheel. When disengaged, the vehicle may be controlled only via the parent-assist handle. Alternatively, the vehicle may be controlled via the user input devices on the body of the vehicle and the selectors on the parent-assist handle.

Alternative hood 116 may allow the vehicle to travel at a faster speed when coupled to the body. For example, drive assembly 96 may be adapted to restrict driving of one or more driven wheels of the wheel assembly to less than all drive configurations (such as no high speed drive configuration) of a plurality of drive configurations responsive to the detection system detecting that the alternative hood is not coupled to the body. However, the drive assembly may allow driving of the one or more driven wheels in all drive configurations of the plurality of drive configurations responsive to the detection system detecting that the alternative hood is coupled to the body.

Although alternative hood 116 is shown to include a particular ornamental appearance of a hood with a hot rod engine, the alternative hood (and other accessories) may alternatively, or additionally, include any suitable ornamental appearance(s). For example, the alternative hood may include toy weapons, etc.

Figure 6:
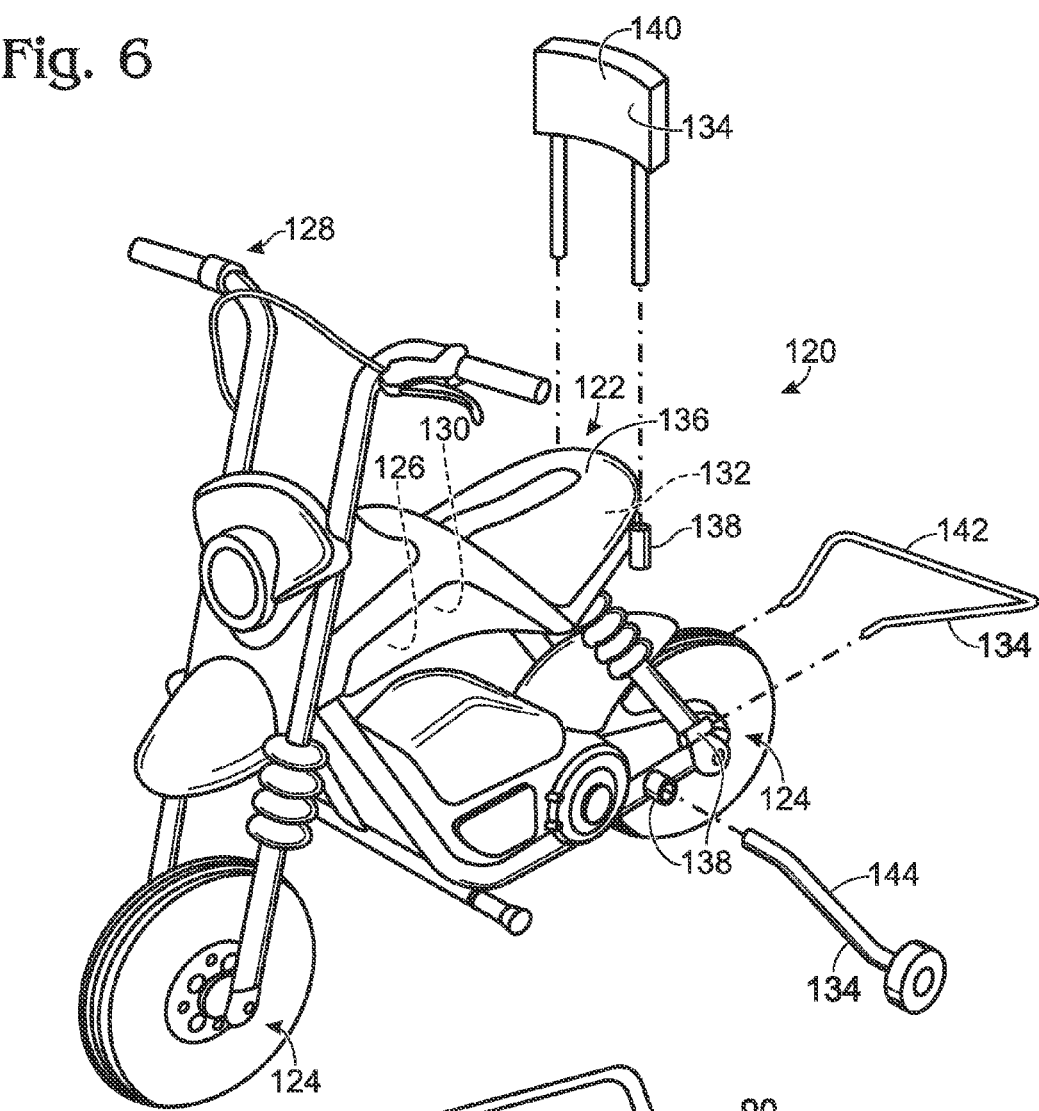
FIG. 6 is an isometric view of a children's ride-on vehicle with a detection system showing other examples of accessories.

Another example of children's ride-on vehicle 20 is shown in FIG. 6, and is generally indicated at 120. Unless otherwise specified, children's ride-on vehicle 120 may include one or more components and/or one or more functions of the components of other children's ride-on vehicles described in the present disclosure. Children's ride-on vehicle 120 may include a body 122, a wheel assembly 124, a drive assembly 126, a steering assembly 128, a control assembly 130, a detection system 132, and accessories 134.

Body 122 may include at least one seat 136 and a connection assembly 138. Connection assembly 138 may include any suitable structure configured to receive or attach to one or more of the accessories, such receptacles shown in FIG. 6.

Detection system 132 may include any suitable structure configured to detect whether the accessories are coupled to the body, such as via connection assembly 108. Drive assembly 126 may be adapted to restrict driving of one or more driven wheels of the wheel assembly to less than all drive configurations of a plurality of drive configurations based on whether the accessory(ies) are coupled to the body. Additionally, or alternatively, drive assembly 126 may be adapted to disengage the gear selector from a motor of the vehicle responsive to the detection system detecting that the accessory(ies) are coupled (or not coupled) to the body. Alternatively, or additionally, the steering assembly 128 may be adapted to disengage the steering wheel from one or more steerable wheels of the wheel assembly responsive to the detection system detecting that the accessory(ies) are coupled (or not coupled) to the body.

Accessories 134 may include a back rest 140, a wheelie bar 142, and one or more training wheels 144. In some embodiments, back rest 140 may be selectively adjusted among a plurality of positions, such as the small-seat and large-seat positions discussed above. Coupling of one or more of accessories 134 to the body may, for example, reduce the speed that the vehicle can travel.

For example, drive assembly 126 may be adapted to restrict driving of one or more driven wheels of the wheel assembly to less than all drive configurations (such as no high speed drive configuration) of a plurality of drive configurations responsive to the detection system detecting that one or more of accessories 134 is coupled (or not coupled) to the body. However, the drive assembly may allow driving of the one or more driven wheels in all drive configurations of the plurality of drive configurations responsive to the detection system detecting that the accessories are not coupled (or coupled) to the body.

In some embodiments, drive assembly 126 may incrementally restrict driving of one or more driven wheels of the wheel assembly to less and less of the available drive configurations of the plurality of drive configurations based on the number of accessories 134 coupled (or not coupled) to the body. Alternatively, the drive assembly may incrementally reduce the speed associated with each drive configuration based on the number of accessories 134 coupled (or not coupled) to the body. Although particular accessories are shown in FIGS. 4 and 6, vehicle 20 may additionally, or alternatively, include any suitable accessories.

Figures 7, 8:
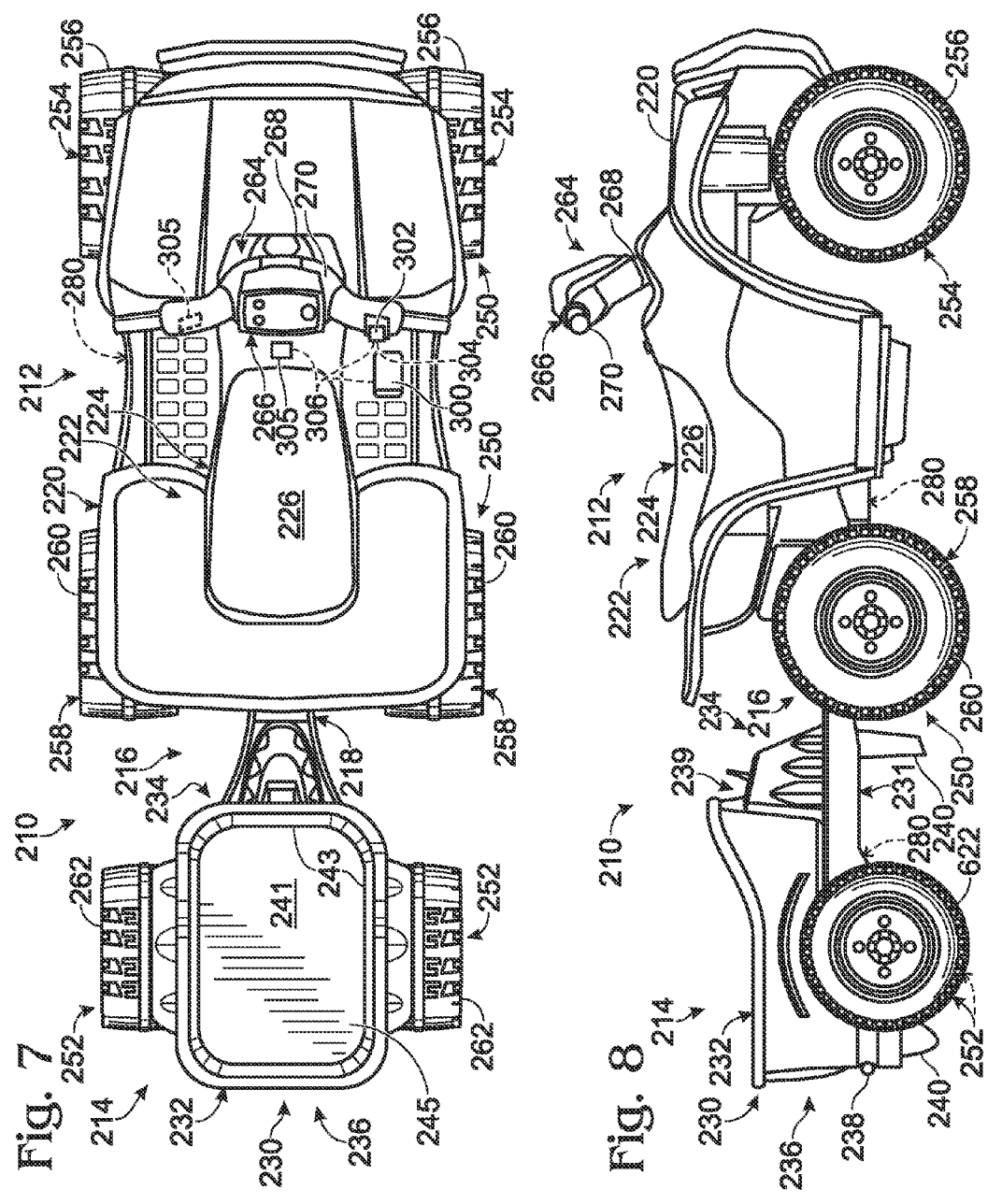

Another example of a children's ride-on vehicle assembly is shown in FIGS. 7 and 8, and is indicated generally at 210. Unless otherwise specified, children's ride-on vehicle assembly may include one or more components and/or one or more functions of the components of other children's ride-on vehicles described in the present disclosure. Ride-on vehicle assembly 210 includes a leading vehicle 212. Unlike conventional children's ride-on vehicles, assembly 210 further includes an accessory in the form of a towed, or trailing, vehicle 214. As illustrated, the leading and trailing vehicles are reduced-scale vehicles that are sized and designed for use by children.

Trailing vehicle 214 is releasably, or removably, coupled to the leading vehicle by a connection apparatus, or connection assembly, 216, as will be discussed in more detail herein. By "releasably, or removably, coupled," it is meant that the vehicle assembly is designed to permit the leading vehicle to be used with or without the trailing vehicle being coupled thereto. Therefore, the leading vehicle may be used as an independently operable children's ride-on vehicle. When it is desirable to couple the trailing vehicle to the leading vehicle, such as to transport a child passenger, or rider, with the trailing vehicle, to transport toys or other objects, or simply to increase the play value of the vehicle assembly, the trailing vehicle may be coupled to the leading vehicle. In other words, the vehicles are designed to be repeatedly coupled together and disconnected, with the connection apparatus being adapted to retain the vehicles in a coupled configuration until a child, parent or other individual uncouples the vehicles. The connection apparatus may be described as being in a coupled configuration when the trailing vehicle is coupled to the leading vehicle by the connection apparatus for relative movement therewith, and in an uncoupled configuration when the trailing vehicle is not coupled to the leading vehicle by the connection apparatus. Similarly, the leading and trailing vehicles may be described as being in coupled and uncoupled configurations depending upon whether or not the vehicles are coupled for relative movement as a unit by the connection apparatus.

Connection apparatus 216 may provide a pivotal connection with the leading and trailing vehicles. Alternatively, the connection apparatus may provide a fixed, or non-pivotal, connection between the interconnected portions of the leading and the trailing vehicles. In some embodiments, connection apparatus 216 includes a hitch assembly 218 that is configured to selectively and releasably couple and uncouple the trailing vehicle to the leading vehicle for relative movement with the leading vehicle. An example of a suitable hitch assembly is a ball-and-socket hitch that pivotally couples the trailing vehicle to the leading vehicle. However, it is within the scope of the present disclosure that the connection apparatus may be of any form suitable for selectively coupling the trailing vehicle to the leading vehicle. Other examples include pin-and-slot connectors, releasable clamps, and other mechanisms by which complimentary components of the leading and the trailing vehicles are releasably secured and retained together so that driving operation of the leading vehicle draws the trailing vehicle with the leading vehicle.

As shown in FIG. 7, leading vehicle 212 includes a leading vehicle body 220 or similar support frame, which may provide a riding space, or passenger compartment, 222 with a seat assembly 224 that is sized and configured to accommodate at least one child, including a child driver. Seat assembly 224 may be integral with or otherwise mounted on leading vehicle body 220 and may have any suitable configuration, including configurations in which the position of the seat assembly is adjustable within the passenger compartment, and configurations in which the seat assembly includes two or more seats or two or more seating regions. Typically, leading vehicle 212 will be sized for use either by a child driver or by a child driver and a child passenger. In the illustrated embodiment, seat assembly 224 includes a seat, or seating region, 226, sized and positioned to receive a child driver.

Trailing vehicle 214 includes a trailing vehicle body 230 having a front end region 234 and a rear end region 236. In the illustrated embodiment, body 230 includes a frame, or chassis, 231 and a bed 232. Also shown in FIG. 8 are optional supports 240 for the trailing vehicle. Supports 240 are adapted to support and/or orient the trailing vehicle against a ground surface, such as when the trailing vehicle is not coupled to a leading vehicle. The supports may provide a more horizontal orientation to the uncoupled trailing vehicle and/or provide a stop that engages a ground surface to inhibit rolling of the trailing vehicle along the ground surface when it is uncoupled from a leading vehicle. When the trailing vehicle includes a wheel assembly that supports the trailing vehicle in a horizontal orientation, such as a wheel assembly that includes forward and rearward wheels, supports 240 will typically not be used.

Figure 9:
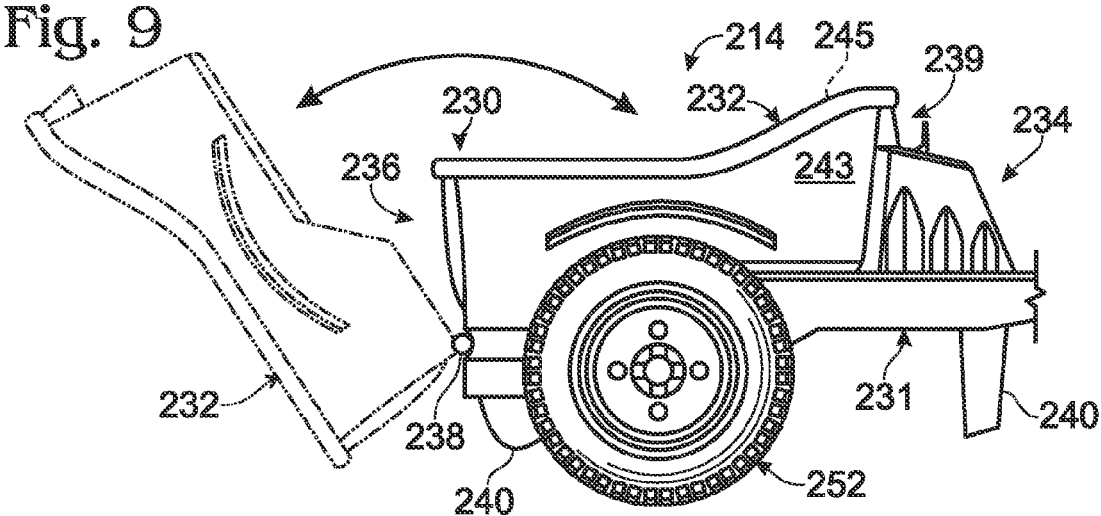
FIG. 9 is a side elevation view of the trailing vehicle of the children's ride-on vehicle assembly of FIG. 7, showing pivotal movement of a bed portion relative to a frame, or chassis, of the trailing vehicle body.

As shown in FIG. 8, the bed may be pivotal relative to the frame, with the pivotal connection formed by at least one hinge 238 or other pivotal linkage. As illustrated in FIG. 9, the bed may be adapted to pivot relative to the trailing vehicle chassis between a first position, in which the bed is supported by or otherwise retained against the chassis, such as shown in solid lines, and a second position, in which the bed is pivoted, or inclined, relative to the first position. This pivotal connection of the bed enables the trailing vehicle to be used as a dump vehicle, thereby adding play value to the vehicle assembly. For example, trailing vehicle body 230 may be adapted carry a child and/or assist in transportation of articles such as toys or similar cargo, as is appropriate for children. As perhaps best seen in FIG. 7, the example of bed 232 includes a bottom surface 241 and sidewalls 243 that extend around the perimeter of bottom surface 241. The bed may be described as defining a compartment 245 that is bounded by bottom surface 241 and sidewalls 243.

When bed 232 is pivotally coupled to the trailing vehicle's chassis, the trailing vehicle also may include a latch mechanism, which is schematically illustrated at 239, that selectively retains the bed in the first position, such as until a child manually releases the latch mechanism and pivots the bed away from the first position. As such, the latch mechanism may be described as preventing the pivoting of the bed away from the first position until the latch mechanism is released or otherwise disengaged. Latch mechanism 239 may take any suitable form, such as including a catch on a first one of the bed and the chassis, and a deflectable or repositionable detent on the other of the bed and the chassis. The latch mechanism may be, but is not required to be, biased to automatically engage, and thereby retain the bed in the first position, upon pivoting of the bed from a second position back to the first position.

Figure 11:
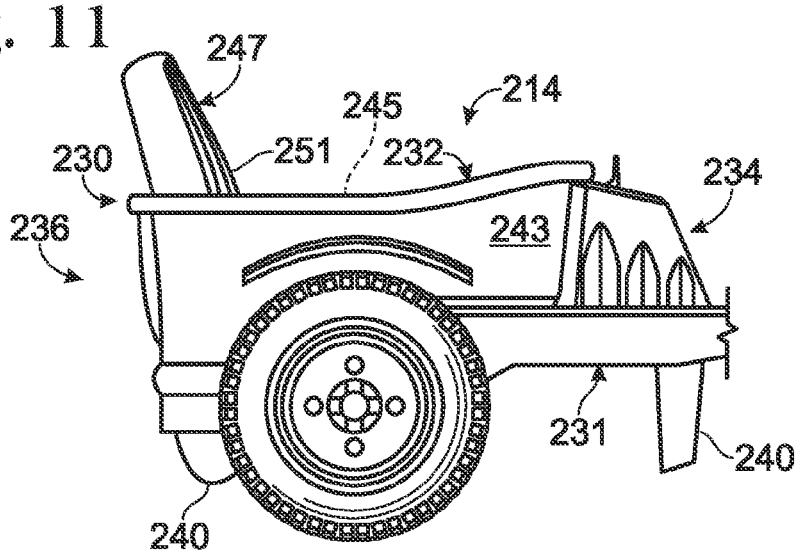
FIG. 11 is a side elevation view of another illustrative trailing vehicle that may be used with the children's ride-on vehicle assembly of FIG. 7.
Figure 12:
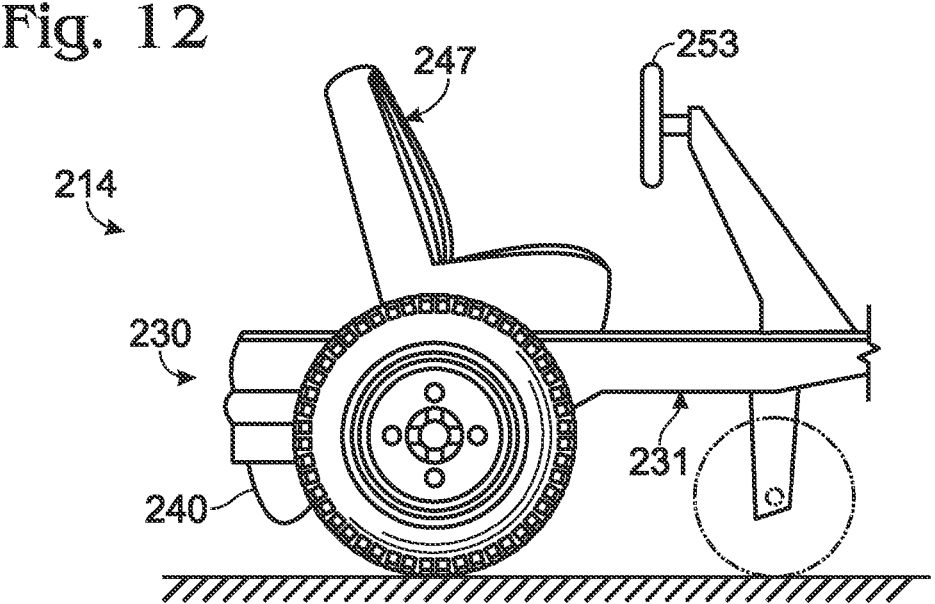
FIG. 12 is a side elevation view of another illustrative trailing vehicle that may be used with the children's ride-on vehicle assembly of FIG. 7.

In the illustrated example of trailing vehicle 214 shown in FIGS. 7-9, the vehicle may be described as taking the general form of a trailer, wagon, or similar structure. It is within the scope of the present disclosure that the trailing vehicle may have any suitable functional and/or ornamental shape, such as to complement the leading vehicle, to add play value to the vehicle assembly, to be adapted to transport a child or specific type of article(s), etc. As further examples, the trailing vehicle may include a passenger region with at least one seat, storage compartments, and/or handlebars or other simulated or actual steering mechanisms. The trailing vehicle may resemble an independently operable ride-on or other vehicle, or, as discussed in more detail herein, may even be an independently operable children's ride-on vehicle, which may include any of the drive assemblies and/or steerable assemblies disclosed herein. Several of these configurations for trailing vehicle 214 are shown in FIGS. 10-12.

Figure 10:
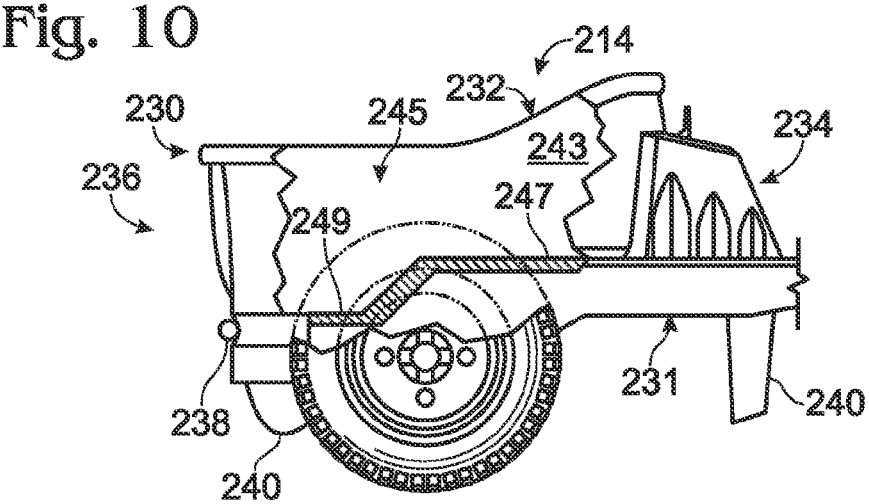
FIG. 10 is a partial cross-sectional side elevation view of another illustrative trailing vehicle that may be used with the children's ride-on vehicle assembly of FIG. 7.

FIG. 10 illustrates a variation of the pivotal bed 232 shown in FIGS. 7-9. More particularly, FIG. 10 illustrates a pivotal bed 232 that defines a compartment 245 having a seat 247 and a footboard 249, which in the depicted example forms a surface that is positioned lower than the seat and configured to support a child's feet when the child is sitting on the seat. In FIG. 10, the bed is adapted so that the child passenger faces away from the leading vehicle when the child is sitting on the seat. It is within the scope of the present disclosure that other orientations, such as forward facing orientations may be used. A potential benefit of the rear-facing, rearward pivoting configuration shown in FIG. 10 is that the child's weight, when the child is sitting on seat 247, is primarily positioned forward of the trailing vehicle's axle (upon which its wheels are mounted) and away from hinge(s) 238. FIG. 11 illustrates an example of a trailing vehicle that includes a forward-facing seat 247 and which does not include a pivotal bed. In FIG. 11, seat 247 is shown including a back rest 251 that projects above the sidewalls of the bed.

As further variants, seat 247 may be omitted to provide a bed with a cargo compartment that is not pivotal relative to the chassis 231 of the trailing vehicle, at least one region or even all of the sidewalls may be partially or completely removed, and/or a seat and/or bed construction similar to FIG. 10 may be utilized. FIG. 12 illustrates an example of a trailing vehicle that includes a seat 247 and a body 230 that does not include a bed. Also shown in FIG. 12 is an optional steering mechanism 253, such as may be secured in a fixed orientation relative to the body to provide a hand rest for a child sitting on seat 247, may be rotatable to simulate the receipt of steering inputs, and/or which may even be coupled to a steerable wheel or wheels of the trailing vehicle to permit actual steering of the vehicle. Other simulated or actual steering mechanisms may be used in place of the illustrated (simulated or actual) steering mechanism 253, such as handlebars. FIG. 12 also demonstrates in dashed lines that the trailing vehicle may include at least one forward wheel and at least one rearward wheel, which enables the trailing vehicle to roll along a ground surface even if uncoupled from a leading vehicle. As discussed herein, at least one of these wheels may be steerable and/or driven, although it is also within the scope of the disclosure that the trailing vehicle includes only non-steerable, non-driven wheels.

Additional examples of children's ride-on vehicle assemblies, and components thereof, such as hitch assemblies and trailing vehicles, are disclosed in U.S. Provisional Patent Application Ser. No. 60/589,267, the complete disclosure of which is hereby incorporated by reference for all purposes.

As shown in FIGS. 7 and 8, leading vehicle 212 is shaped to generally resemble a reduced-scale all-terrain, or "quad," vehicle, and trailing vehicle 214 is shaped to resemble a trailer that is towed by the leading vehicle. However, children's ride-on vehicle assemblies according to the present disclosure may be shaped to generally resemble any type of vehicle or vehicles. Examples of full-sized vehicles that the leading and/or trailing vehicles may be designed to resemble, albeit in a reduced-scale, child-sized version, include cars, trucks, construction vehicles, emergency vehicles, off-road vehicles, motorcycles, space vehicles, aircraft, watercraft and the like. It is also within the scope of the present disclosure that either or both of the vehicles in assembly 210 may be shaped to resemble fantasy vehicles that do not have a corresponding adult-sized counterpart. Although leading vehicle 212 is depicted in the form of a reduced-scale all-terrain vehicle, it will be appreciated that the components and/or features of vehicle assembly 210 may be configured for use on any type of children's ride-on vehicle.

Typically, at least substantial portions of each vehicle will be formed from molded plastic, although it is within the scope of the present disclosure that any suitable material, or combination of materials, may be used. When molded plastic parts are used, they may be integrally formed or formed from a plurality of parts that are secured together by screws, bolts, clips or other suitable fasteners. Vehicle assembly 210 may additionally, or alternatively, be at least partially formed from other suitable material(s), such as metal, wood, or composite materials. Vehicle assembly 210 may include an underlying frame on which a chassis is mounted, for either or both of leading vehicle 212 and trailing vehicle 214. In such an embodiment, the frame is often formed of metal and/or molded plastic, with the chassis typically formed of molded plastic.

It is within the scope of the present disclosure that vehicle assembly 210 may include more than one trailing vehicle. For example, in some embodiments, a leading vehicle may be adapted to tow more than one trailing vehicle, which may be collectively or successively coupled to the leading vehicle. Similarly, a trailing vehicle may itself include a connection apparatus, such as any of the connection apparatus that are disclosed, illustrated and/or incorporated herein, which selectively enables another trailing vehicle to be coupled thereto. Moreover, although the depicted vehicle assembly is disposed such that the leading vehicle is adapted to pull the trailing vehicle behind the leading vehicle as the leading vehicle moves over a ground surface, other configurations may be implemented. For example, the trailing vehicle may include a drive assembly that is adapted to propel the trailing vehicle along a ground surface, with the leading vehicle being pushed along the ground surface by the trailing vehicle.

As discussed above, vehicle assembly 210 further includes wheels, with each of the leading and the trailing vehicles including at least one wheel, and typically at least a pair of wheels, such as may be mounted on a common axle, or aligned axles. The wheels enable the vehicles to travel over a ground surface as the wheels are rotated. The wheels may be driven wheels, which are adapted to be rotationally driven by a drive assembly, steerable wheels, which are adapted to be pivoted or otherwise oriented to steer the ground-traveling path of the vehicle, or free wheels, which are neither positively driven nor steered. Instead, free wheels simply are rotatable, such as in response to ground-traveling movement caused by the driving rotation of a driven wheel. It is within the scope of the disclosure that a wheel is both a driven wheel and a steerable wheel, although this is not required. In many applications, it may be desirable and/or or more cost effective to have separate driven and steerable wheels.

To provide an example of a suitable wheel assembly, and with reference back to FIGS. 7 and 8, vehicle assembly 210 is indicated as including a set of wheels. As shown, a first plurality of wheels 250 are rotatably coupled to the leading vehicle 212, and a second plurality of wheels 252 are rotatably coupled to the trailing vehicle 214. The first plurality of wheels includes a steerable wheel assembly 254 containing at least one steerable wheel 256, and a driven wheel assembly 258 containing at least one driven wheel 260. In the illustrated example, a pair of steerable wheels and a pair of driven wheels are shown in the first plurality of wheels, but the number and configuration of these wheels may vary within the scope of the present disclosure. Similarly, the second plurality of wheels includes a pair of free wheels 262 in the illustrated example, but the number and configuration of these wheels also may vary within the scope of the present disclosure.

As indicated at 264 in FIGS. 7 and 8, at least the leading vehicle includes a steering assembly that is adapted to receive steering inputs and steer the steerable wheel assembly responsive to the received steering inputs. Any suitable structure may be used to receive steering inputs, such as from a child sitting on the vehicle's seat, and to steer the steerable wheel(s) responsive thereto. The steering inputs received from a child sitting on seat 226 may be referred to as user-imparted steering inputs. In FIGS. 7 and 8, steering assembly 264 is shown including a steering mechanism 266 that is interconnected to steerable wheels 256 via a steering column 268. In FIGS. 7 and 8, steering mechanism 266 takes the form of handlebars 270. However, it is within the scope of the present disclosure that other mechanisms may be used, such as a steering wheel or steering levers. As discussed, it is also within the scope of the present disclosure that the trailing vehicle also may include a steering assembly. However, when the trailing vehicle is not configured for selective use as an independently operable children's ride-on vehicle, it may be desirable to not include a functional steering assembly so that the trailing vehicle cannot receive steering inputs that counteract or otherwise impair steering inputs to the leading vehicle.

Figure 13:
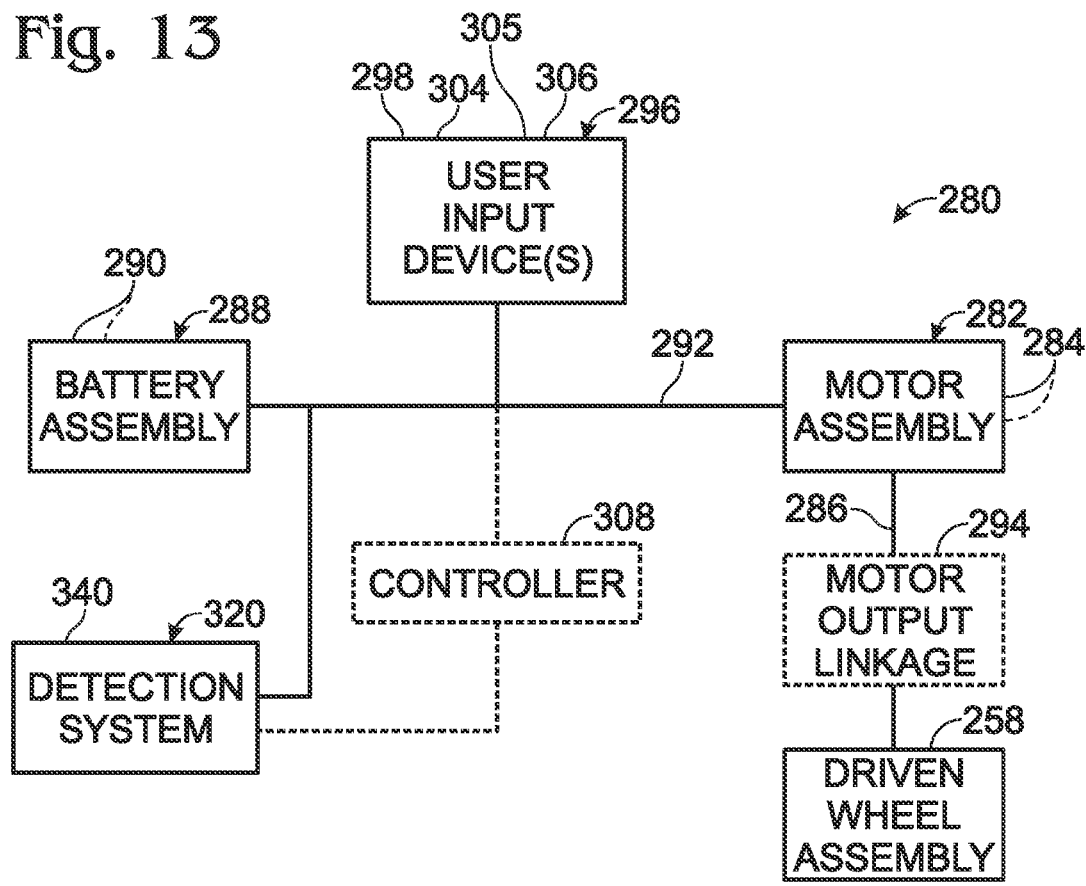
FIG. 13 is a schematic diagram of an illustrative drive assembly for the children's ride-on vehicle of FIG. 7.

As indicated at 280 in FIGS. 7 and 8, leading vehicle 212 includes a drive assembly that is adapted to drive the rotation of driven wheel assembly 258 and thereby cause ground-traveling movement of the leading vehicle and any attached trailing vehicle. As discussed, and as indicated schematically in FIG. 8 in dashed lines, it is within the scope of the present disclosure, but not required, that trailing vehicle 214 also may include a drive assembly 280. In FIG. 13, an example of a suitable drive assembly 280 for a children's ride-on vehicle, such as leading vehicle 212 and optional trailing vehicle 214, is schematically depicted. The illustrated drive assembly is an example of a drive assembly that includes a battery-powered motor assembly. Drive assembly 280 is adapted to drive the rotation of driven wheel assembly 258. The drive assembly includes a motor assembly 282, which includes at least one battery-powered motor 284 that is adapted to drive the rotation of at least one of the vehicle's driven wheels. The motor assembly includes at least one output 286 that provides a rotational input to the driven wheel(s). Typically, the output 286 from each of the one or more motors includes a rotating shaft and/or a rotation pinion or output gear. However, output 286 may include more than one shaft, pinion, and/or gear, such as when motor assembly 282 includes more than one motor and/or when driven wheel assembly 258 includes more than one driven wheel. Motor assembly 282 may also be configured to power other moveable components on vehicle 212, such as depending on the form of the vehicle.

In the illustrated schematic diagram, power for the motor assembly is provided by battery assembly 288. It is within the scope of the present disclosure that other power sources for the motor assembly may be used, in which case the battery assembly described and/or illustrated herein may be referred to as a power assembly that is adapted to energize or otherwise provide power to the motor assembly. Battery assembly 288 includes at least one battery, or cell, 290 that is adapted to provide power to the motor assembly. Any suitable type and number of batteries may be used in battery assembly 288. Although not required, the batteries are typically rechargeable batteries. For example, one or more six-, twelve-, eighteen-, or twenty-four-volt batteries have proven effective. Examples of suitable battery assemblies are disclosed in U.S. Pat. No. 6,509,719, the complete disclosure of which is hereby incorporated by reference for all purposes. The battery assembly may be operatively connected to the motor assembly by any suitable electrical connectors, such as cables, wires, or positive and negative terminals or leads, and the like. The electrical interconnections between the components of the illustrated drive assembly 280 are schematically depicted in FIG. 13 as a wiring harness 292.

In FIG. 13, drive assembly 280 is shown further including an optional motor output linkage 294 that mechanically interconnects the motor assembly with the driven wheel assembly. Motor output linkage 294 may be any suitable mechanism that transmits the rotational input from the motor assembly's output(s) to the driven wheel assembly. Examples of suitable linkages 294 include an intermediate linkage between the output and the driven wheel assembly, such as a gearbox containing one or more gears, a belt or chain drive, a worm gear, one or more individual gears, and the like. The motor output linkage may be adapted to transmit the rotational input from the motor assembly to the driven wheel assembly at the same relative rate of rotation, or it may mechanically augment the rotational input to convey a greater or lesser rate of rotation relative to the rate of rotation of the output of the motor assembly. Drive assembly 280 may be formed without motor output linkage 294, in which case the output(s) 286 of the motor assembly may directly transmit the rotational input to the driven wheel assembly.

Drive assembly 280 also includes one or more user input devices 296 that are adapted to convey inputs from a child sitting on the vehicle's seat, such as seat 226, to the vehicle's drive assembly. User input devices 296 also may be referred to as user control devices. These devices convey a user's inputs, such as via the vehicle's wiring harness 292. An example of a user input device is a drive actuator 298, which is adapted to selectively energize the vehicle's motor assembly responsive to a user, such as a child sitting on the vehicle's seat, manipulating or otherwise actuating the input device. In other words, drive actuator 298 is adapted to receive a user input directing the battery assembly to actuate or otherwise energize the motor assembly. Illustrative examples of suitable drive actuators 298 include an on/off switch, a foot pedal, a throttle lever, and a rotational handgrip on a steering mechanism that includes a handlebar. In FIG. 7, an example of a drive actuator 298 is shown in the form of a foot pedal 300 positioned for actuation by a child sitting on seat 226. When the drive actuator takes a form other than a foot pedal, it may be located in any suitable location within or near passenger region 222 so that a child sitting on seat 226 may reach the actuator while positioned to operate the vehicle. For example, an on/off switch or throttle may be located on the body or on the steering mechanism, such as illustrated at 302 in FIG. 7. Although a pair of drive actuators is illustrated in FIG. 7, the drive assembly will often only include a single drive actuator. The drive actuators may enable a user to select within a range of actuations/speeds (such as with a throttle), or simply to select whether or not the motor assembly is energized, such as with an on/off switch.

The user inputs, such as conveyed via user input device(s) 296, may also be adapted to select, or configure, the drive assembly within a plurality of drive configurations. These user inputs may be referred to as configuration inputs and are adapted to enable, or select, one or more of a plurality of drive configurations. These drive configurations may be realized, or implemented, when the motor assembly is energized, such as responsive to actuation/energization of the motor assembly. For example, the plurality of drive configurations may include one or more of the direction in which the drive assembly will propel the vehicle upon energization of the motor assembly, the relative speed or range of speed which the motor assembly is configured/energized to provide, and/or whether the drive assembly is able to be actuated responsive to an actuation input to a drive actuator 298.

For example, speed drive configurations, such as "high" and "low" speed configurations, "high," "medium," and "low" speed configurations, etc., may be selected with one or more user input devices 296 in the form of a speed switch 304. These speed drive configurations may be realized (i.e., the vehicle may be propelled according to the selected speed drive configuration) upon actuation or energization of the motor assembly. As the descriptions used above imply, the speed drive configurations may include a plurality of relative speed configurations, such as a first speed configuration, a second speed configuration that is greater than the first speed configuration, and optionally at least a third or more speed configurations that is/are greater than the second speed configuration.

As another example, direction drive configurations, such as forward and reverse drive configurations, may be selected by a user input device in the form of a direction switch 305, which enables a user to select the relative direction (i.e., clockwise or counterclockwise) of rotation of output(s) 286 and thereby configure the vehicle to drive in forward and reverse directions upon energization of the motor assembly. A further example of drive configurations may be referred to as power configurations and relate to whether or not a user input device, such as a power switch 306, is in an "on" configuration, in which an actuation input results in actuation of the drive assembly, or an "off" configuration, in which the drive assembly is not configured to be energized by actuation inputs. Switches 304, 305 and 306 (when present) may be located in any suitable location on body 220 or steering assembly 264. Preferably, the switches or other user input devices are positioned for actuation by a child sitting on seat 226. Examples of suitable positions are shown in FIG. 7.

The drive assembly may include any suitable structure to selectively enable the plurality of drive configurations. For example, switching between forward and reverse drive configurations may be implemented by reversing the polarity of the battery assembly relative to the motor assembly. As another example, relative speed configurations may be achieved by switching two or more batteries and/or two or more motors between series and parallel configurations. As a further example, gears or similar mechanical structures may be utilized to configure relative speed configurations. As yet another example, a controller may enable the configurations via predetermined programming. Continuing this example, relative speed configurations may be achieved through pulse-width modulation or other duty cycle ramping of the energization of the motor assembly.

It is within the scope of the present disclosure that the plurality of drive configurations may include other configurations than the examples described herein. Similarly, the drive assembly may be configured, such as responsive to user inputs to the user input devices, to a drive configuration that includes more than one of the configurations described above. For example, a vehicle may be configured to such configurations as a low-speed forward configuration, a high-speed forward configuration, a low-speed reverse configuration, a high-speed reverse configuration, a medium-speed forward configuration, a medium-speed reverse configuration, etc.

The implementation of one or more selected drive configurations may occur prior to, simultaneous with, or after receipt of the configuration input(s). For example, a child may, via one or more configuration inputs, select a particular speed and/or direction drive configuration and thereafter, via an actuation input, drive the vehicle according to the selected drive configuration(s). As another example, a child may be driving the vehicle according to a particular drive configuration(s) and thereafter, via one or more configuration inputs, select a different drive configuration(s), such as a different direction or speed configuration. As yet another example, a user input device may provide both actuation and configuration inputs so that actuating the user input device both selects and implements one or more drive configurations.

As shown in FIG. 13, drive assembly 80 may further include a controller 308, which controls the operation of the drive assembly responsive to at least one of received user inputs and predetermined programming. As an example, controller 308 may be adapted to control electronically the transmission of a user-selected speed to the driven wheel assembly and/or to configure the drive assembly to the user-selected drive configuration. Controller 308 may include a microprocessor or suitable control circuit. In the context of configuring the drive assembly to a selected drive configuration, the controller may be adapted to selectively enable or disable selected ones of the plurality of drive configurations responsive to user inputs, such as via user input devices 296, predetermined programming, and/or inputs from other sensors or switches.

When controller 308 is adapted to regulate the energization of the motor assembly, it may regulate electronically the rotational input transmitted by the motor assembly to the driven wheel assembly. For example, controller 308 may regulate at least one of the timing and the ramp, or rate, of application of the transmission of the rotational input after actuation of a corresponding user input device by a child sitting on seat 226. In other words, the controller may be configured to delay in at least time and/or rate of transmission the rotational input to the driven wheel assembly responsive at least in part to a user input selecting the desired, or selected, rotational input. An example of a suitable controller is disclosed in U.S. Pat. No. 6,771,034, the complete disclosure of which is hereby incorporated by reference for all purposes.

It is also within the scope of the present disclosure that controller 308 may selectively control the transmission of the selected rotation input (such as determined by the selected speed configuration and/or actuation input). By this it is meant that the controller may be configured control the transmission of the selected rotational input in certain situations, such as when certain parameters or thresholds are satisfied. For example, controller 308 may only regulate the transmission of rotational input when the selected rotational input occurs when the leading vehicle is already being driven (such as during a user-selected change in speed or direction), when the leading vehicle is already traveling at more than a predetermined speed (actual or selected), when the leading vehicle changes direction, or when a second vehicle, such as trailing vehicle 214 is coupled to the leading vehicle.

As indicated in FIG. 13 at 320, the drive assembly further includes, or otherwise communicates with, a detection system that is adapted to detect whether a trailing vehicle is coupled to a vehicle, such as to a leading vehicle's connection apparatus. As such, detection system 320 may be referred to as a trailing vehicle detection system. Upon detection that the trailing vehicle is coupled to the connection apparatus of a leading vehicle, the drive assembly is adapted to automatically restrict, or disable, at least one of the plurality of drive configurations. In other words, when the trailing vehicle is not coupled to the leading vehicle, a plurality of drive configurations, such as those discussed above, are available and may be selected (such as via user inputs to devices 304-306) and may be realized or implemented (such as via inputs to drive actuator(s) 98). However, when the trailing vehicle is coupled to the leading vehicle, only a subset (i.e., less than all) of the plurality of drive configurations are available. By "available," it is meant that the drive assembly is restricted or prevented from implementing one or more of the plurality of drive configurations.

The restriction of the plurality of drive configurations to a subset of the plurality of drive configurations may be accomplished through any suitable electrical and/or mechanical mechanisms. Preferably, this restriction occurs regardless of user inputs that otherwise would select and implement the selected drive configuration if the trailing vehicle was not coupled to the leading vehicle. Furthermore, the restriction of one or more of the plurality of available drive configurations and the return to this plurality of available drive configurations preferably occurs automatically responsive to the trailing vehicle being coupled and uncoupled to the leading vehicle.

As an example, it may be desirable to prevent a leading vehicle which otherwise may be driven in forward and reverse drive configurations from being driven in a reverse drive configuration when a trailing vehicle is coupled to the leading vehicle. Upon detection of the trailing vehicle being coupled to the leading vehicle, such as by detection system 220, the drive assembly is prevented (such as via controller 308, via a suitable switch, or otherwise) from being configured to a reverse drive configuration. A child may still manipulate or otherwise press a direction input device to select a reverse drive configuration. However, the drive assembly is not reconfigured responsive to the child's actuation of the direction input device. For example, a controller may be programmed to not respond to the user input from the direction input device, the drive assembly may be toggled to disengage the reverse drive switch when the trailing vehicle is attached, a switch may be toggled (and/or a circuit selectively opened or closed) when the trailing vehicle is coupled to the leading vehicle, with the post-coupling drive assembly not enabling a reverse drive configuration, etc. When the trailing vehicle is uncoupled from the leading vehicle, the drive assembly of the leading vehicle may again be configured to a reverse drive configuration. Preferably, other than selecting a reverse drive configuration, no other action is required by the user other than to uncouple the leading and trailing vehicles.

As another example, when a trailing vehicle is coupled to a leading vehicle, detection system 320 may be utilized to prevent the drive assembly of the leading vehicle from being configured to a high-speed drive configuration and/or to a drive configuration in which the selected or actual speed exceeds a predetermined threshold. The examples of restricting reverse drive and/or high-speed drive configurations responsive to a detection system 320 detecting that a trailing vehicle is coupled to a leading vehicle are intended to be only examples. It is within the scope of the present disclosure that a vehicle's drive assembly may be configured to selectively restrict any of its plurality of drive configurations responsive to the detection that a trailing vehicle is coupled to the vehicle. As such, it should be understood that the type and number of drive configurations available to a particular ride-on vehicle may vary, such as depending upon the particular construction and components of that vehicle. The detection system and cooperating components of drive assembly 280 may be referred to herein as a means for restricting the plurality of drive configurations of the drive assembly. In the context of a drive assembly in which a reverse drive configuration is restricted, the drive assembly may be described as including means for restricting reverse driving or a reverse drive configuration. In the context of a drive assembly in which a high-speed drive configuration is restricted, the drive assembly may be described as including means for restricting a high-speed operation or a high-speed drive configuration.

Figure 14:
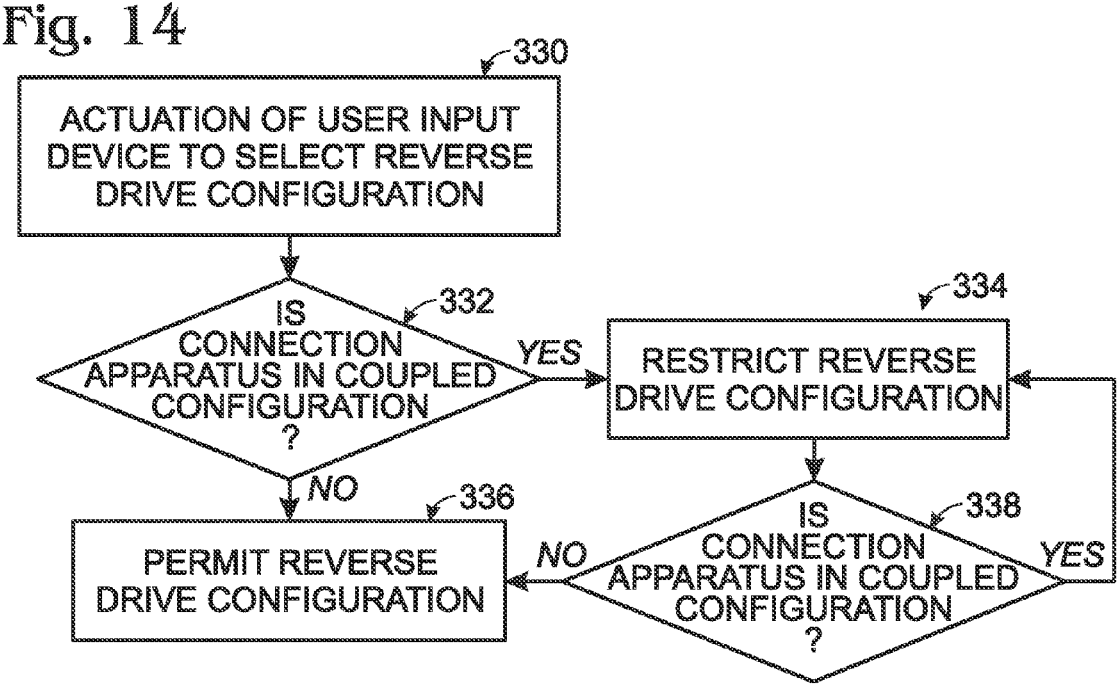
FIG. 14 is a flow chart showing illustrative examples of a vehicle's drive assembly selectively restricting a reverse drive configuration responsive to whether or not a trailing vehicle is coupled thereto.

FIG. 14 provides a flowchart illustrating examples of configurations in which the drive assembly (whether or not a controller is present) with a detection system according to the present disclosure is adapted to selectively restrict the plurality of available drive configurations when a trailing vehicle is coupled to a leading vehicle. As discussed, and as graphically depicted in FIG. 14, the detection system is adapted to detect whether or not the connection apparatus, which releasably interconnects the leading and trailing vehicles, is in its coupled or uncoupled configuration. When coupled, the plurality of drive configurations is automatically restricted to a subset thereof. When uncoupled, the full plurality of available drive configurations is automatically restored. As discussed, the fact that a drive configuration is available does not mean that it is necessarily achieved, as achieving an available drive configuration implies that a user selects that drive configuration from the plurality of available drive configurations. Although the illustrated flow chart is expressed in the context of selectively restricting reverse drive configurations, a similar flowchart may be used for other drive configurations that are restricted by the drive assembly responsive to the configuration of the connection apparatus.

At 330 in FIG. 14, a user actuates a user input device 296 to select a drive configuration from the plurality of drive configurations. In the example, the user selects a reverse drive configuration. Whether or not this drive configuration is an available or restricted one of the plurality of drive configurations determines whether or not this selected drive configuration may be achieved responsive to the user selection thereof, as indicated at 332. If the connection apparatus is in its uncoupled configuration, as detected, for example, by the detection system, then the full plurality of drive configurations are available and may be achieved as they are selected by the user. In the case of the reverse drive configuration selected in this example, if the reverse drive configuration is one of the restricted drive configurations and the connection apparatus is in its coupled configuration, then achieving the reverse drive configuration is restricted, as indicated at 336. If, however, the connection apparatus is in its uncoupled configuration, then the reverse drive configuration may be achieved, as indicated at 334. At 338, a graphical indication is shown that the determination of whether or not the connection apparatus is in its coupled or uncoupled configuration is preferably a repeated (either continuous or periodic) determination, with the reverse drive or other potentially restricted drive configuration being selectively available or restricted automatically responsive to the coupled configuration of the connection apparatus.

It is within the scope of the present disclosure that the selective restriction of the plurality of drive configurations may be coupled with an automatic selection of another of the plurality of drive configurations and/or a maintaining of the drive configuration that was selected before the restricted drive configuration was selected. For example, when a restricted drive configuration is selected while a leading vehicle's drive assembly is not being used to drive the rotation of the vehicle's driven wheel assembly, the drive assembly may be configured to simply remain in this at rest, or non-driven, drive configuration until a user selects a drive configuration that is not restricted. As another example, the drive assembly may be configured to respond to the selection of a restricted drive configuration by instead configuring one of the drive configurations that is not restricted. For example, if the above-discussed restricted reverse drive configuration is selected while the vehicle assembly is being driven in a forward drive configuration, the drive assembly may be adapted to automatically transition to an unpowered, or off, drive configuration in which the motor assembly is not energized by the battery assembly. As another example, if a high-speed drive configuration is a restricted drive configuration and is selected by a user, the drive assembly may instead maintain or configure a medium- (if not restricted) or low-speed drive configuration. As another example, it may instead select an off drive configuration, in which the vehicle's motor assembly will not be energized until a non-restricted drive configuration is selected. In such an embodiment, the vehicle assembly with either coast or brake, depending for example, upon its construction.

Figure 15:
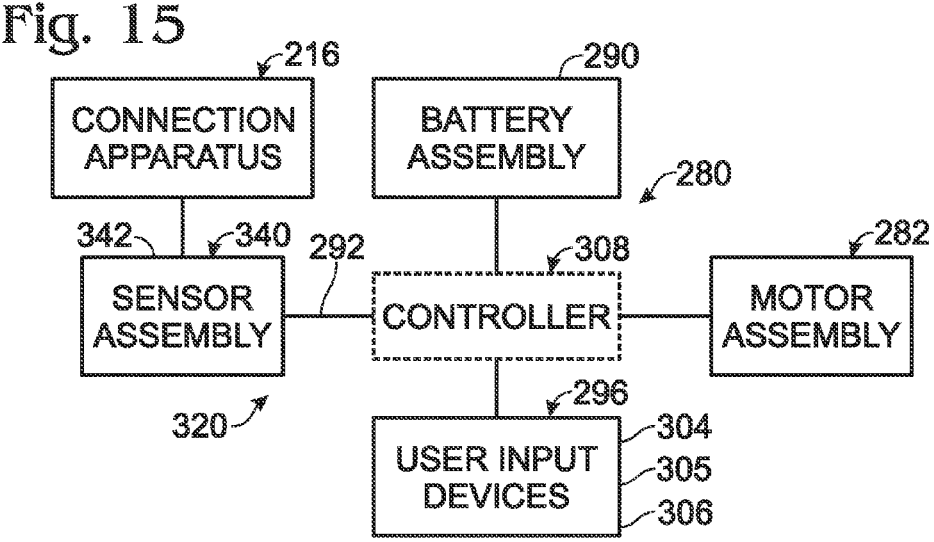
FIG. 15 is a schematic diagram of a portion of the drive assembly shown in FIG. 13 including communication between a connection apparatus and a detection system.

Detection system 320 may utilize any suitable structure for detecting when a trailing vehicle is coupled to a leading vehicle. For example, the detection system may include a sensor assembly 340, as indicated in FIG. 13. As indicated in FIG. 15, sensor assembly 340 may include one or more sensors 342 that are adapted to detect whether or not the connection apparatus is in its coupled configuration. For example, the one or more sensors may be actuated upon coupling or decoupling of a trailing vehicle to a leading vehicle via connection apparatus 216. Sensor assembly 340 may include any suitable number and type of structure for detecting or otherwise determining whether or not the trailing vehicle is coupled to the leading vehicle via the connection apparatus, i.e., whether the connection apparatus is in its coupled configuration. Examples include one or more of an electrical sensor, an optical sensor, a mechanical sensor, conductive contacts, a magnetic sensor, or other suitable sensing or measuring device. FIG. 15 also graphically depicts that detection system 320, such as via sensor assembly 340, selectively communicates with connection apparatus 216 and the rest of drive assembly 280, which in turn selectively permits or restricts one or more of the plurality of drive configurations responsive to inputs or other signals from the detection system. When drive assembly 280 includes a controller, the sensor assembly may communicate with the controller. In view of the above, the detection system may be described as including means for detecting when the connection apparatus is in the coupled configuration.

As discussed, the leading and trailing vehicles are removably interconnected by a connection apparatus 216. Connection apparatus 216 refers generally to any suitable structure for selectively interconnecting the leading and trailing vehicles so that driving movement of the leading vehicle will draw the trailing vehicle for movement with the leading vehicle. By "removably interconnected," it is meant that the interconnecting structures of the vehicles that comprise the connection apparatus are adapted to be repeatedly interconnected, or coupled together, for the vehicle assembly to move as a unit, and disconnected, or uncoupled from each other, for the leading and/or trailing vehicles to be moved, driven or otherwise used independent of the other vehicle. An example of a suitable connection apparatus is a hitch assembly 218, with examples of suitable hitches disclosed in the above-incorporated patent application. The connection apparatus preferably enables pivotal movement of the leading and trailing vehicles, but this is not required, as one or both of the vehicles may include other structure or mechanisms that enable this pivotal movement, or the vehicle assembly may be configured so that the trailing vehicle remains in a fixed orientation relative to the leading vehicle. As also discussed, the vehicle assembly includes a detection system that is adapted to detect whether or not the trailing vehicle is coupled to the leading vehicle, such as by detecting whether the connection apparatus is in its coupled or uncoupled configuration, and selectively restricting the available ones of a plurality of drive configurations of the leading vehicle responsive thereto.

In FIGS. 16-20, examples of connection apparatus are shown. In the illustrated examples, connection apparatus 216 include portions 350 and 352 that respectively form part of each of the leading and trailing vehicles. These portions are adapted to interconnect with each other to couple the vehicles together, with the detection system including a sensor assembly 340 that detects whether or not this operative configuration exists. It is within the scope of the present disclosure that the entire connection apparatus exists on one of the vehicles, such as on the leading vehicle. It is also within the scope of the disclosure that the connection apparatus includes a specialized structure on one of the vehicles, such as a clamp or other component that is adapted to engage any of a series of portions on the other vehicle. In other words, it is not required for both vehicles to include specially designed components for the resulting vehicle assembly to be described as including a connection apparatus. What is important is that the vehicle assembly includes a suitable mechanism for releasably coupling the vehicles together for movement as a unit and a suitable detection system for determining whether the vehicles are coupled together and restricting the driving configurations of the leading vehicle if the vehicles are coupled together.

In FIG. 16, a connection apparatus 216 is shown in the form of a hitch assembly 218 that includes interconnecting portions 350 and 352 that have a ball-and-socket configuration. In the illustrated example, portion 350 is shown forming a portion of trailing vehicle 214, and portion 352 is shown forming a portion of leading vehicle 212, with a portion of the leading vehicle's wiring harness 292 being shown in fragmentary lines. As also illustrated, portion 352 includes a ball portion 354 onto which, and/or around which, a socket portion 356 of portion 350 extends. Sensor assembly 340 of detection system 320 includes a switch 358 that is adapted to be moved from its unactuated, or resting, position (shown in dashed lines), to its actuated, or coupled, position (shown in solid lines) when the socket portion is coupled to the ball portion. When moved from its first position to its second position, the switch may selectively open or close a circuit or otherwise send a signal to the controller or other portion of the drive assembly, thereby communicating the coupled configuration of the connection apparatus and resulting in the corresponding restriction of the driving configurations available to the drive assembly of the leading vehicle. In the illustrated example, placing the socket portion in an operative position on the ball portion depresses or otherwise moves the switch from its first, unactuated position to its second, actuated position. Preferably, a switch, such as switch 358, that is selectively moved between first and second positions responsive to whether or not the trailing vehicle is coupled to the leading vehicle (i.e., responsive to whether the connection apparatus is in its coupled or uncoupled configuration), also includes a suitable biasing mechanism 360 that biases the switch to its unactuated position. Any suitable structure may be used for biasing mechanisms, such as springs, resilient members, and the like. Therefore, when the trailing vehicle is disconnected from the leading vehicle and the connector apparatus is thereby in its uncoupled configuration, the switch automatically returns to its first, unactuated position. It is within the scope of the present disclosure that the switch may be otherwise positioned on the ball portion. Similarly, the switch of sensor assembly 340 may extend from the socket portion, with the switch being actuated by the socket engaging the ball portion, such as by the ball portion engaging a depressable or otherwise moveable switch. In such an embodiment, portion 350 would be described as forming a portion of leading vehicle 212, and portion 352 would be described as forming a portion of trailing vehicle 214. The illustrated geometry and configuration of the ball and socket portions may vary without departing from the scope of the disclosure.

Another example of a connection apparatus 216 with a detection system 320 that includes a sensor assembly 340 adapted to detect whether or not the connection apparatus is in its coupled or uncoupled configuration is shown in FIG. 17. As shown, interconnecting portion 350 includes a projecting member 361 that defines a guide 362. Portion 352 includes a socket, or aperture, 364 that is adapted to be mounted on the guide to couple the portions together and thereby configure the connection apparatus to its coupled configuration. The detection system shown in FIG. 17 includes a sensor assembly 340 with a pair of spaced-apart metallic or otherwise conductive sensors 342 that are in communication with the drive assembly of the leading vehicle, such as via wiring harness 292. As also shown, portion 352 includes a metallic or other conductive portion 366 that, upon coupling portions 350 and 352 together to place the connection apparatus in its coupled configuration, forms a conductive path between sensors 342. These conductive sensors may be described as forming a switch that is selectively configured between a first position, in which the conductive path is not formed between sensors 342 and portion 366, and a second position, in which the conductive path is formed. Detection system 320 detects the resulting signal or closed circuit. The contacts may, but are not required to, include or be associated with magnetic portions to urge the contacts together. This example does not require the sensor to include a biased switch and instead relies upon a conductive path being selectively completed or interrupted responsive to the coupled or uncoupled configuration of the connection apparatus. Portions 350 and 352 may be shaped to provide a pivotal connection or a non-pivotal connection, such as defined by the shape of member 361 and/or socket 364. If portions 350 and 352 are designed to pivot relative to each other, sensors 342 and/or conductive portion 366 should be sized and/or shaped to maintain the desired conductive path through the pivotal range of movement. Variants to this configuration have sensors 342 biased apart from each other, and portion 352 urging the conductive sensors into contact with each other when the connection apparatus is in its coupled configuration. As shown in dashed lines in FIG. 17, the guide has a variety of configurations, including configurations in which the guide inhibits removal of portion 352 or otherwise restricts unintentional separation of the portions. Similar to the example shown in FIG. 16, portions 350 and 352 may be reversed relative to the leading and the trailing vehicles. In such a configuration, the conductive portions may also be reversed.

A further example of a connection apparatus 216 in the form of a hitch assembly 218 having a pin-and-socket configuration is shown in FIGS. 18-20. In FIG. 18, portion 350 is shown including a projecting, or linking member, 370 that is adapted to be received into, or by, a corresponding socket, or receiver, 371 on portion 352, which is shown in FIG. 19 and defines a passage or aperture 372. In the example of a projecting member shown in FIG. 18, the member extends from a body 374, which may have a variety of forms without departing from the scope of the present disclosure. For example, the body may be integrally formed with one of the vehicles, pivotally coupled to one of the vehicles, mounted on one of the vehicles, etc. In the illustrated example, projecting member 361 has a rectangular cross-section (relative to its long axis or axis of insertion into passage 372), but other configurations may be used. For example, a circular cross-section may be used to enable rotation of the projecting member with the receiver, such as to enable pivotal movement of the leading and trailing vehicles relative to each other while the connection apparatus is in its coupled configuration. The example of a projecting member also includes an example of a retention mechanism 376 that is adapted to retain the projecting member within the receiver and thereby retain the connection apparatus in a coupled configuration. As shown, retention mechanism 376 includes a pair of spaced-apart legs, or prongs, 378, each of which includes a ridge, or detent portion, 380. Detent portions are adapted to extend sufficiently into or through passage 372 to restrict unintentional withdrawal of the prongs from the receiver. Prongs 378 may be formed of a material of a predetermined elasticity, or be otherwise mechanically reinforced, to require a predetermined amount of compressive force to be applied before the ridges are urged sufficiently toward each other than they can be withdrawn through passage 372. In other embodiments, the connection apparatus may be supplied with a key-operable locking mechanism or similar device suitable to prevent unintentional uncoupling.

In FIG. 19, the connection apparatus illustrates another example of a detection system 320 with a sensor assembly 340 having a pair of spaced-apart metallic or otherwise conductive sensors 342, with portion 350 (which is perhaps best seen in FIG. 18) including a metallic or otherwise conductive bridging, or spanning, member 366 that is adapted to form a conductive path with the sensors 342 when the connection apparatus is in its coupled configuration. In FIG. 20, the pin-and-socket assembly provides another example of a detection system 320 with a sensor assembly 340 with a sensor 342 in the form of a switch that is moved, preferably against its bias, between at least first and second positions by the coupling of portions 350 and 352 together. In this embodiment, conductive portion 366 is not needed on portion 350.

While examples of children's ride-on vehicles with detection systems have been illustrated and described herein, the vehicles and their detection systems may take a wide variety of other forms, as desired or beneficial for a particular application, without departing from the scope of the present disclosure.

The disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any claim recites "a" or "a first" element or the equivalent thereof, such claim should be understood to include incorporation of one or more such elements, neither requiring nor excluding two or more such elements.

Inventions embodied in various combinations and subcombinations of features, functions, elements, and/or properties may be claimed through presentation of new claims in a related application. Such new claims, whether they are directed to a different invention or directed to the same invention, whether different, broader, narrower or equal in scope to the original claims, are also regarded as included within the subject matter of the inventions of the present disclosure.

What is claimed is:

1. A children's ride-on vehicle, comprising:
a body having a seat assembly that includes a seat configured to support a child;
a plurality of wheels rotatably coupled to the body, wherein the plurality of wheels includes at least one steerable wheel and at least one driven wheel;
a steering assembly positioned to receive inputs from a child supported by the seat assembly and adapted to selectively steer the at least one steerable wheel;
a drive assembly adapted to selectively drive rotation of the at least one driven wheel in a plurality of drive configurations, wherein the drive assembly includes:
a motor assembly comprising at least one electric motor;
at least one user input device positioned to receive inputs from a child supported by the seat assembly and adapted to selectively actuate the motor assembly; and
a battery assembly including at least one battery adapted to selectively energize the motor assembly; and
a detection system adapted to detect at least one condition of the children's ride-on vehicle, wherein the drive assembly is adapted to restrict, based on the detection system detecting the at least one condition, driving of the at least one driven wheel to one or more, but less than all, drive configurations of the plurality of drive configurations;
wherein the at least one condition includes whether at least one accessory that is adapted to be selectively coupled to and decoupled from the body is coupled to the body, and wherein the accessory is selected from the group consisting of training wheels adapted to increase the stability of the children's ride-on vehicle, a back rest, a wheelie bar, a parent-assist handle, and a hood.

2. The children's ride-on vehicle of claim 1, in combination with the at least one accessory.

3. The children's ride-on vehicle of claim 1,
wherein the at least one condition includes whether a parent-assist handle that is adapted to be selectively coupled to and decoupled from the body is coupled to the body; and
wherein the steering assembly is adapted to restrict, based on the detection system detecting that the parent-assist handle is coupled to the body, steering of the at least one steerable wheel by inputs received from a child supported by the seat assembly.

4. The children's ride-on vehicle of claim 3, wherein the steering assembly is adapted to restrict, based on the detection system detecting the at least one condition, steering of the at least one steerable wheel by inputs received from a child supported by the seat assembly regardless of user inputs received by the steering assembly.

5. The children's ride-on vehicle of claim 1, wherein the at least one condition includes whether training wheels that are adapted to be selectively coupled to and decoupled from the body are coupled to the body.

6. The children's ride-on vehicle of claim 5, in combination with the training wheels.

7. The children's ride-on vehicle of claim 5, wherein the drive assembly is adapted to restrict, based on the detection system detecting the at least one condition, driving of the at least one driven wheel to less than all drive configurations regardless of user input received by the at least one user input device.

8. The children's ride-on vehicle of claim 1, wherein the at least one condition includes whether a back rest that is adapted to be selectively coupled to and decoupled from the body is coupled to the body.

9. The children's ride-on vehicle of claim 8, in combination with the back rest.

10. The children's ride-on vehicle of claim 8, wherein the drive assembly is adapted to restrict, based on the detection system detecting the at least one condition, driving of the at least one driven wheel to less than all drive configurations regardless of user input received by the at least one user input device.

11. The children's ride-on vehicle of claim 1, wherein the at least one condition includes whether a wheelie bar that is adapted to be selectively coupled to and decoupled from the body is coupled to the body.

12. The children's ride-on vehicle of claim 11, in combination with the wheelie bar.

13. The children's ride-on vehicle of claim 11, wherein the drive assembly is adapted to restrict, based on the detection system detecting the at least one condition, driving of the at least one driven wheel to less than all drive configurations regardless of user input received by the at least one user input device.

14. The children's ride-on vehicle of claim 1, wherein the at least one condition includes whether a hood that is adapted to be selectively coupled to and decoupled from the body is coupled to the body.

15. The children's ride-on vehicle of claim 14, in combination with the hood.

16. The children's ride-on vehicle of claim 14, wherein the drive assembly is adapted to restrict, based on the detection system detecting the at least one condition, driving of the at least one driven wheel to less than all drive configurations regardless of user input received by the at least one user input device.

17. The children's ride-on vehicle of claim 1, wherein the at least one condition includes whether a parent-assist handle that is adapted to be selectively coupled to and decoupled from the body is coupled to the body.

18. The children's ride-on vehicle of claim 17, in combination with the parent-assist handle.

19. The children's ride-on vehicle of claim 17, wherein the drive assembly is adapted to restrict, based on the detection system detecting the at least one condition, driving of the at least one driven wheel to less than all drive configurations regardless of user input received by the at least one user input device.

20. A children's ride-on vehicle, comprising:
a body having a seat assembly that includes a seat configured to support a child;
a plurality of wheels rotatably coupled to the body, wherein the plurality of wheels includes at least one steerable wheel and at least one driven wheel;
a steering assembly positioned to receive inputs from a child supported by the seat assembly and adapted to selectively steer the at least one steerable wheel;
a drive assembly adapted to selectively drive rotation of the at least one driven wheel in a plurality of drive configurations, wherein the drive assembly includes:
a motor assembly comprising at least one electric motor;
at least one user input device positioned to receive inputs from a child supported by the seat assembly and adapted to selectively actuate the motor assembly; and a battery assembly including at least one battery adapted to selectively energize the motor assembly; and a detection system adapted to detect at least one condition of the children's ride-on vehicle, wherein the drive assembly is adapted to restrict, based on the detection system detecting the at least one condition, driving of the at least one driven wheel to one or more but less than all, drive configurations of the plurality of drive configurations;

wherein the seat is configured to be selectively adjusted between a small-seat position, in which the seat assembly is configured to support a first child, and a large-seat position, in which the seat assembly is configured to support a second child that is larger than the first child;

wherein the at least one condition includes whether the seat is in one of the small-seat position and the large-seat position.

21. The children's ride-on vehicle of claim 20, wherein the drive assembly is adapted to restrict, based on the detection system detecting the at least one condition, driving of the at least one driven wheel to less than all drive configurations regardless of user input received by the at least one user input device.

22. A children's ride-on vehicle, comprising:

a body having a seat assembly that includes a seat configured to support a child;

a plurality of wheels rotatably coupled to the body, wherein the plurality of wheels includes at least one steerable wheel and at least one driven wheel;

a steering assembly positioned to receive inputs from a child supported by the seat assembly and adapted to selectively steer the at least one steerable wheel;

a drive assembly adapted to selectively drive rotation of the at least one driven wheel in a plurality of drive configurations, wherein the drive assembly includes:

a motor assembly comprising at least one electric motor;

at least one user input device positioned to receive inputs from a child supported by the seat assembly and adapted to selectively actuate the motor assembly; and a battery assembly including at least one battery adapted to selectively energize the motor assembly; and a detection system adapted to detect at least one condition of the children's ride-on vehicle, wherein the drive assembly is adapted to restrict, based on the detection system detecting the at least one condition, driving of the at least one driven wheel to one or more, but less than all, drive configurations of the plurality of drive configurations;

wherein the at least one condition includes a weight of a child supported by the seat.

23. The children's ride-on vehicle of claim 22, wherein the at least one condition includes whether the weight of a child supported by the seat assembly exceeds a threshold weight.

24. The children's ride-on vehicle of claim 22, wherein the at least one condition includes whether the weight of a child supported by the seat assembly is less than a threshold weight.

25. The children's ride-on vehicle of claim 22, wherein the drive assembly is adapted to restrict, based on the detection system detecting the at least one condition, driving of the at least one driven wheel to less than all drive configurations regardless of user input received by the at least one user input device.

* * * * *